US008052778B2

(12) United States Patent
McFarland et al.

(10) Patent No.: US 8,052,778 B2
(45) Date of Patent: Nov. 8, 2011

(54) ADVANCED WETTED WALL AEROSOL SAMPLING CYCLONE SYSTEM AND METHODS

(76) Inventors: Andrew R. McFarland, Houston, TX (US); Eric G. Burroughs, Morrisville, NC (US)

( * ) Notice: Subject to any disclaimer, the term of this patent is extended or adjusted under 35 U.S.C. 154(b) by 343 days.

(21) Appl. No.: 12/348,709

(22) Filed: Jan. 5, 2009

(65) Prior Publication Data

US 2009/0193971 A1 Aug. 6, 2009

Related U.S. Application Data

(60) Provisional application No. 61/019,031, filed on Jan. 4, 2008.

(51) Int. Cl.
*B01D 47/00* (2006.01)

(52) U.S. Cl. ........... 95/219; 95/220; 73/863.21; 96/316; 96/321; 96/413

(58) Field of Classification Search .................... 95/220; 55/392.1; 96/316
See application file for complete search history.

(56) References Cited

U.S. PATENT DOCUMENTS

| | | | |
|---|---|---|---|
| 4,246,013 | A | 1/1981 | Truhan et al. |
| 4,940,473 | A | 7/1990 | Benham |
| 5,769,243 | A | 6/1998 | McCarthy |
| 6,217,636 | B1 | 1/2001 | Murden et al. |
| 6,530,484 | B1 | 3/2003 | Bosman |

FOREIGN PATENT DOCUMENTS

| | | | |
|---|---|---|---|
| JP | 08052383 | A | 2/1996 |
| JP | 2007307475 | A | 11/2007 |

OTHER PUBLICATIONS

International Application No. PCT/US2009/030138 International Search Report dated Sep. 30, 2009, 7 pages.

PCT/US2008/068611 International Search Report, Jun. 25, 2009 (3 p.).

Moncla, Brandon,"A Study of Bioaerosol Sampling Cyclones," Texas A&M University, Dec. 2004 (67 p.).

Phull, Manpreet Singh, "An Improved Wetted-Wall Bioaerosol Sampling," Texas A&M University, Aug. 2005 (73 p.).

Lapple, C.E., "Processes Use Many Collector Types," Department of Chemical Engineering, Ohio State University, May 1951, Chemical Engineering, 144-151 (8 p.).

Moore, Murray E., et al., "Performance Modeling of Single-Inlet Aerosol Sampling Cyclones," Environ. Sci. Technol., vol. 27, No. 9, 1993, 1842-1848 (7 p.).

(Continued)

*Primary Examiner* — Duane Smith
*Assistant Examiner* — Tiffany N Palmer
(74) *Attorney, Agent, or Firm* — Conley Rose, P.C.

(57) ABSTRACT

A wetted wall cyclone system for sampling an aerosol. In an embodiment, the system comprises a cyclone body including an inlet end, an outlet end, and an inner flow passage extending therebetween. In addition, the system comprises a cyclone inlet tangentially coupled to the cyclone body proximal the inlet end. The cyclone inlet includes an inlet flow channel in fluid communication with the inner flow passage of the cyclone body. Further, the system comprises a skimmer coaxially coupled to the outlet end of the cyclone body. The skimmer comprises a separation end extending into the outlet end of the cyclone body, a free end distal the outlet end of the cyclone body, and an inner exhaust channel in fluid communication with the inner flow passage of the cyclone body. Still further, the system comprises means for reducing the temperature of at least a portion of the cyclone body.

24 Claims, 10 Drawing Sheets

OTHER PUBLICATIONS

Haglund, John S., "Design and Characterization of Two Wetted-Wall Cyclones for Bioaerosol Collection," Aerosol Technology Laboratory, Texas A&M University System, Scientific Conference on Obscuration and Aerosol Research, RDECOM and Battelle Memorial Institute, Aberdeen, Maryland, Jun. 22, 2005 (22 p.).
Seo, Y.J., et al., "Wetted Wall Bioaersol Sampling Cyclone," Aerosol Technology Laboratory, Texas A&M University, Applied Research Laboratories, University of Texas, SCOAR 2006, Jun. 28, 2006 (23 p.).
Wang, Jian-Jun, et al., "Effect of a Stick on the Gas Turbulence Structure in a Cyclone Separator," Aerosol Science and Technology, 39:713-721, 2005 (10 p.).
Gimbun, Jolius, et al., "Prediction of the Effects of Cone Tip Diameter on the Cyclone Performance," Aerosol Science 36, 1056-1065, 2005 (10 p.).
Kenny, L.C., et al., "A Direct Approach to the Design of Cyclones for Aerosol-Monitoring Applications," J. Aerosol Sci., vol. 13, No. 12, 1407-1420, 2000 (14 p.).
Kim, C.H., et al., "A New Collection Efficiency Model for Small Cyclones Considering the Boundary-Layer Effect," Aerosol Science 32, 251-269, 2001 (19 p.).
Griffiths, W.D., et al., "Computational Fluid Dynamics (CFD) and Empirical Modelling of the Performance of a Number of Cyclone Samplers," J. Aerosol Sci., vol. 27, No. 2, 281-304, 1996 (24 p.).
Hoekstra, a.J., et al., "An Experimental and Numerical Study of Turbulent Swirling Flow in Gas Cyclones," Chemical Engineering Science 54, 2055-2065, 1999 (11 p.).
Mathur, S.R., et al., "A Pressure-Based Method for Unstructured Meshes," Numerical Heat Transfer, Part B, 31:195-215, 1997 (22 p.).
Gu, Fang, et al., "CFD Simulation of Liquid Film Flow on Inclined Plates," Chem. Eng. Technol., 27, No. 10, 1099-1104, 2004 (6 p.).
Ataki, Adel, et al., "The Use of the VOF-Model to Study the Wetting of Solid Surfaces," Chem. Eng. Technol., 27, No. 10, 1109-1114 (6 p.).
Black, R.S., et al., "Development of the Wet Walled Cyclone Collector for the Joint Biological Point Detection System," Scientific Conferences on Obscuration and Aerosol Research, Battelle Memorial Institute, Jun. 25, 2002 (32 p.).
Hu, Shishan, et al., "Heat Transfer Study on a Bioaerosol Sampling Cyclone," Engineering Applications of Computational Fluid Mechanics, vol. 2, No. 3, 309-318, Sep. 2008 (10 p.).
Hu, S., et al., "Numerical Performance Simulation of a Wetted Wall Bioaerosol Sampling Cyclone," Aerosol Science and Technology, 41:160-168, Feb. 2007 (9 p.).

ADVANCED WETTED WALL AEROSOL SAMPLING CYCLONE SYSTEM AND METHODS

CROSS-REFERENCE TO RELATED APPLICATIONS

This application claims the benefit under 35 U.S.C. §119 (e) of U.S. Provisional Patent Application Ser. No. 61/019,031 filed Jan. 4, 2008 and entitled "Advanced Wetted Wall Aerosol Sampling Cyclone System and Methods," which is hereby incorporated herein by reference in its entirety.

STATEMENT REGARDING FEDERALLY SPONSORED RESEARCH OR DEVELOPMENT

This invention was made with Government support from the Edgewood Chemical Biological Center of the U.S. Amy Research, Development and Engineering Command under Contract No. DAAD13-03-C-0050. The government may have certain rights in this invention.

BACKGROUND

1. Field of the Invention

The invention relates generally to apparatus, systems, and methods for separating and collecting particulate matter from a fluid. More particularly, the invention relates to a wetted wall cyclone and method of using the same for separating and collecting particular matter on a liquid layer or film. Still more particularly, the invention relates to a wetted wall cyclone and method of using the same for bioaerosol collection and concentration in ambient conditions.

2. Background of the Invention

A cyclone separator is a mechanical device employed to remove and collect particulate matter or solids from a gas, typically air, by the use of centrifugal force. The gaseous suspension containing the fine particulate matter, often referred to as an "aerosol," is tangentially flowed into the inlet of a cyclone body, resulting in a vortex of spinning airflow within the cyclone body. As the aerosol enters the cyclone, it is accelerated to a speed sufficient to cause entrained particles having sufficient inertia to move radially outward under centrifugal forces until they strike the inner wall of the cyclone body.

In a wetted wall cyclone, the particulate matter moving radially outward is collected on a liquid film or layer, also known as a "collection fluid" or "collection liquid", that is formed on at least a portion of the inner surface of the cyclone wall. The liquid film is created by injecting the liquid into the cyclone body. When injected into the cyclone body, the liquid may be atomized into droplets, which are then deposited on the inner wall of the cyclone to form the liquid film. The liquid may be continuously injected or applied at periodic intervals to wash the inner surface of the cyclone wall. Shear forces caused by the cyclonic bulk airflow, which may be aided by the force of gravity, cause the liquid layer on the inner surface of the cyclone wall, as well as the particulate matter entrained therein, to move axially along the inner surface of the cyclone wall as a film, as droplets, or as rivulets toward a skimmer positioned downstream of the cyclone body. In wetted wall cyclone separators using water as the injected collection fluid, the suspension of water and entrained particulate matter is often referred to as a "hydrosol".

The liquid film, droplets, or rivulets on the inner surface of the cyclone wall including the entrained particulate matter are separated from the bulk airflow by a skimmer from which the liquid film and particles entrained therein are aspirated from the cyclone body. The processed or "cleansed" air (i.e., the air remaining after the particulate matter has been separated) exits the cyclone body and may be exhausted to the environment or subject to further separation. In this manner, at least a portion of the particulate matter in the bulk airflow is separated and collected in a more concentrated form that may be passed along for further processing or analysis. The concentration of the particulate matter separated from the bulk airflow can be increased by several orders of magnitude by this general process.

Wetted wall cyclone separators are used for a variety of separating and sampling purposes. For instance, wetted wall cyclones may be used as part of a bioaerosol detection system in which airborne bioaerosol particles are separated and collected in a concentrated form that can be further analyzed to assess the characteristics of the bioaerosol particles.

The effectiveness or ability of the cyclone separator to separate and collect such particulate matter is often measured by the aerosol-to-hydrosol collection efficiency which is calculated by dividing the amount of particles of a given size that leave the cyclone separator in the hydrosol exhaust stream by the amount of particles of that same size that enter the cyclone in the bulk airflow or aerosol state.

In most conventional wetted wall cyclones, the liquid skimmer is connected to the cyclone body at a location where the cyclone body has an expanded or increased radius section. In such a diverging flow region, the cyclonic airflow tends to decelerate in the axial direction. As a result, the hydrosol liquid flowing along the inner wall of the cyclone body proximal the skimmer may collect and buildup in a relatively stagnant ring-shaped torus. Some of the hydrosol contained within such a torus may be undesirably swept up and entrained in the cyclonic airflow, and exit the cyclone body along with such separated airflow, thereby bypassing the skimmer and associated aspiration. This phenomenon, often referred to as "liquid carryover", degrades the cyclone's separation and collection capabilities. In particular, liquid carryover can significantly decrease the aerosol-to-hydrosol collection efficiency. For instance, Battelle Memorial Institute, Columbus, Ohio developed a wetted wall cyclone that was designed to operate at an air flow rate of 780 L/min and an effluent liquid flow rate of about 1.5 mL/min. The aerosol-to-hydrosol collection efficiency for particles in the size range of 1.5 to 6.5 μm aerodynamic diameter (AD) is about 60%; however, the unit frequently exhibits water carryover which significantly reduces the aerosol-to-hydrosol efficiency.

New systems are being developed for near-real-time analyses of bioaerosols, which can provide detection and identification of hazardous bioaerosol particles. These systems typically require samples in the hydrosol form with an equivalent liquid flow rate on the order of one-hundred μL/min. Such systems may be employed to sample air from occupied environments at room temperature or from ambient environments, where both relatively high and low temperatures may be experienced.

The effectiveness and efficiency of a wetted wall cyclone operated in a sub-freezing environment may be significantly reduced if the injected liquid and/or the hydrosol begin to solidify or freeze. It may be particularly desirable, for these applications, to control the temperature of the cyclone body, injected liquid, hydrosol, or combinations thereof, to prevent solidification of the wetting liquid. Thus, in such environments the skimmer must also be designed to ensure effective aspiration of the liquid including operation in sub-freezing conditions. As another example, in cases where the wetted wall cyclone is employed to sample bioaerosols, it is preferred that the collected aerosol particles contained in the liquid be preserved for further analysis and study. The preservation of biological materials may necessitate a particular temperature range within the cyclone. Many conventional wetted wall cyclones do not include any means or mechanism to control the temperature of the cyclone body, injected fluid, or hydrosol. In addition, although the Battelle cyclone previously discussed employs an electric heating element to control the temperature of the cyclone body, its effectiveness drops off significantly in environments having an ambient temperature below about −10° C. even when heated with a relatively large 350 watts of electrical power. Still further, most conventional heated wetted wall cyclones employ a single heater to control the temperature of the cyclone body. However, the air flow patterns within the cyclone body result in variations in local turbulent heat transfer coefficients, which can result in temperature gradients along the cyclone body. Moreover, in heated wetted wall cyclones employing a single heat source, undesirable hot spots and/or cold spots often develop on the cyclone body. Such hot or cold spots may damage biological materials, and/or may cause partial solidification of the collection liquid in certain regions of the cyclone body. Furthermore, relying on the use of a single large heater in sub-freezing environments may require undesirably high power consumption.

For relatively hot-dry ambient environments, collection fluid evaporation has conventionally been addressed by simply increasing the flow rate of the injected collection fluid. However, this may be problematic for samplers positioned at remote locations, where additional collection fluid is not readily available, and thus, the use of minimal amounts of collection fluid is desirable. Batch-type aerosol samplers have been reported where a known amount of liquid is added to the collector prior to use, the collector is operated for the desired period of time during which makeup liquid is added to compensate for evaporation losses, and the liquid is recovered for analysis. However, such batch systems do not enable near-real-time detection capabilities, and further, still require makeup liquid during operation in hot-dry environments.

Accordingly, there remains a need in the art for sampling systems and methods for operation thereof enabling operation in ambient conditions, including relatively hot-dry as well as sub-freezing environments. Particularly well received would be a wetted wall cyclone separator and method operable with minimal liquid consumption, minimal power consumption, and/or variable temperature control of select areas of the cyclone body and concomitantly offering the potential for reduced liquid carryover and/or improved efficiency.

BRIEF SUMMARY OF SOME OF THE PREFERRED EMBODIMENTS

These and other needs in the art are addressed in one embodiment by a wetted wall cyclone system. In an embodiment, the system comprises a cyclone body including an inlet end, an outlet end, and an inner flow passage extending therebetween. In addition, the system comprises a cyclone inlet tangentially coupled to the cyclone body proximal the inlet end. The cyclone inlet includes an inlet flow channel in fluid communication with the inner flow passage of the cyclone body. Further, the system comprises a skimmer coaxially coupled to the outlet end of the cyclone body. The skimmer comprises a separation end extending into the outlet end of the cyclone body, a free end distal the outlet end of the cyclone body, and an inner exhaust channel in fluid communication with the inner flow passage of the cyclone body extending between the separation end and the free end. The separation end includes a reduced diameter leading edge defining an annulus between the outer radial surface of the separation end and the inner surface of the cyclone body proximal the outlet end of the cyclone body. Still further, the system comprises means for reducing the temperature of at least a portion of the cyclone body.

These and other needs in the art are addressed in another embodiment by a method of sampling an aerosol. In an embodiment, the method comprises providing a wetted wall cyclone comprising a cyclone body including an inlet end, an outlet end, and an inner flow passage extending therebetween. The wetted wall cyclone further comprises a cyclone inlet tangentially coupled to the cyclone body proximal the inlet end. The cyclone inlet includes an inlet flow channel in fluid communication with the inner flow passage of the cyclone body. The wetted wall cyclone also comprises a skimmer coaxially coupled to the outlet end of the cyclone body. The skimmer comprises a separation end extending into the outlet end of the cyclone body, a free end distal the outlet end of the cyclone body, and an inner exhaust channel in fluid communication with the inner flow passage of the cyclone body extending between the separation end and the free end. In addition, the method comprises disposing at least a portion of the cyclone body in a fluid bath comprising a heat transfer fluid.

These and other needs in the art are addressed in another embodiment by a method of sampling an aerosol in relatively hot-dry conditions. In an embodiment, the method comprises providing a wetted wall cyclone comprising a cyclone body including an inlet end, an outlet end, and an inner flow passage extending therebetween. The wetted wall cyclone also comprises a cyclone inlet tangentially coupled to the cyclone body proximal the inlet end. The cyclone inlet includes an inlet flow channel in fluid communication with the inner flow passage of the cyclone body. The wetted wall cyclone further comprises a skimmer coaxially coupled to the outlet end of the cyclone body. The skimmer comprises a separation end extending into the outlet end of the cyclone body, a free end distal the outlet end of the cyclone body, and an inner exhaust channel in fluid communication with the inner flow passage of the cyclone body extending between the separation end and the free end. In addition, the method comprises injecting a collection fluid into the cyclone inlet, wherein the collection fluid comprises a low vapor pressure liquid.

Thus, embodiments described herein comprise a combination of features and advantages intended to address various shortcomings associated with certain prior devices. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF SOME OF THE PREFERRED EMBODIMENTS

Figure 1:
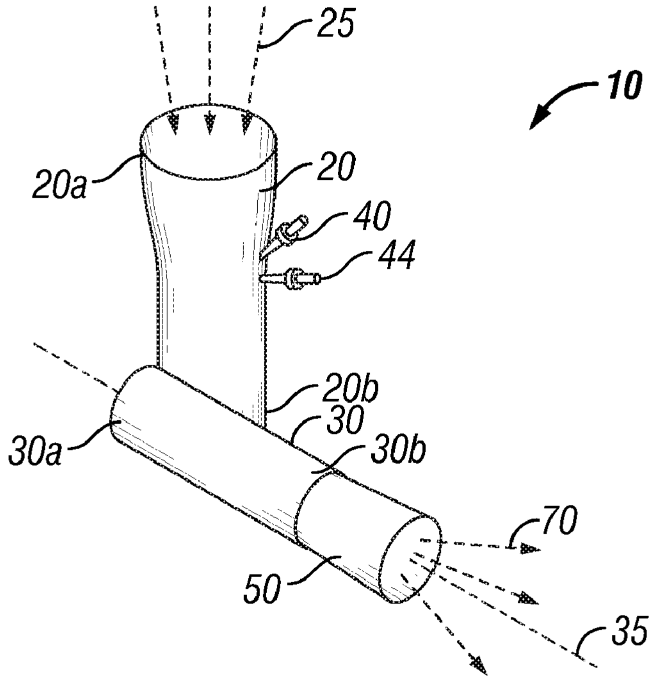
FIG. 1 is perspective view of an embodiment of a wetted wall cyclone system in accordance with the principles described herein.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

Herein disclosed are continuous-flow liquid sampling systems and methods for operation of continuous liquid flow sampling systems in ambient conditions, including sub-freezing environments and relatively hot-dry conditions. In embodiments, the system is a continuous liquid flow Wetted Wall Cyclone (WWC) system.

In embodiments, the sampling system comprises a low freezing point collection fluid thereby reducing the need for heating in cold weather operation. In embodiments, the sampling system comprises cooling of the apparatus to conserve liquid during operation in relatively hot-dry conditions, thereby minimizing the need for makeup liquid to compensate for evaporation losses. In embodiments, the sampling system comprises both a low vapor pressure collection fluid and cooling of at least a portion of the apparatus in contact with the collection liquid.

In embodiments, wherein the wetted wall cyclone system comprises a low vapor pressure collection fluid (e.g., ethylene glycol solution) and cooling (e.g. thermoelectric cooling, submersion in a cooling bath, etc.), this method and system may be referred to as the "liquid conservation concept". Although described herein with respect to a WWC, this "liquid conservation concept" may be used for applications to various liquid-based bioaerosol sampling systems.

In embodiments, the method involves wetted wall air sampling systems (generally bioaerosol samplers) that are used in mild and relatively hot weather applications, where the wall is cooled to reduce liquid consumption; and, optionally, the cooled wall concept combined with use of a collection fluid that contains a liquid such as glycerol, which reduces the liquid consumption but yet is compatible with the sample detection and identification requirements of a particular application.

In embodiments, the sampling system comprises heaters for operation in cold-weather conditions. In embodiments, the sampling system comprises a low freezing point collection fluid thereby eliminating or reducing the need for heating in cold weather operation.

In embodiments, the method involves wetted wall cyclones, which are operated in sub-freezing conditions wherein a portion of the cyclone is optionally heated, and where the collection fluid contains a liquid such as glycol that depresses the freezing point and thereby reduces the heating effect needed to prevent freezing of the collection fluid.

Figure 2:
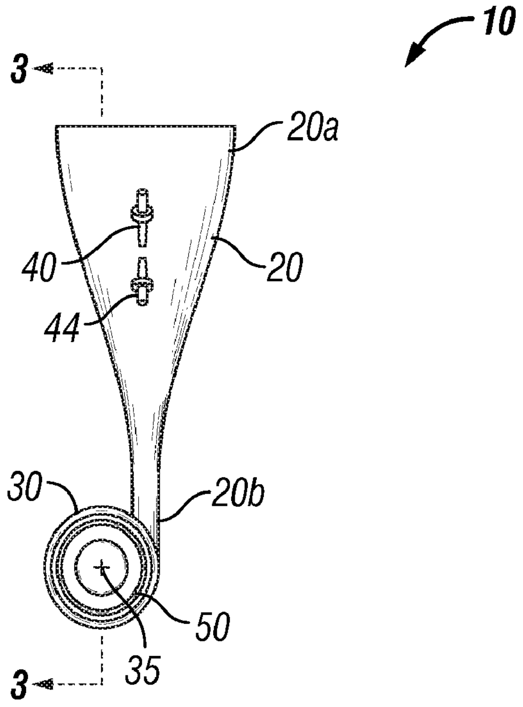
FIG. 2 is an end view of the wetted wall cyclone system of FIG. 1.
Figure 3:
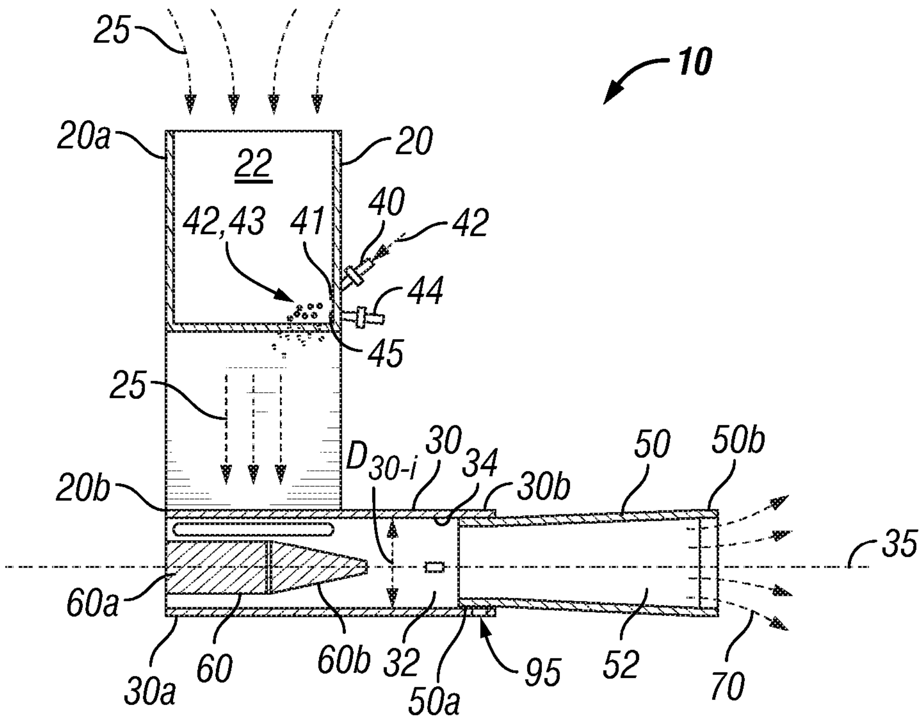
FIG. 3 is a cross-sectional view of the wetted wall cyclone system of FIG. 1.

Referring now to FIGS. 1-3, an embodiment of a wetted wall cyclone (WWC) 10 constructed in accordance with the principles described herein is shown. Wetted wall cyclone 10 comprises an inlet conduit 20, a cyclone body 30, a collection liquid collection liquid injector 40, and a skimmer 50. As will be explained in more detail below, inlet conduit 20, cyclone body 30, and skimmer 50 are in fluid communication.

Cyclone body 30 has a central or longitudinal axis 35 and includes an upstream or inlet end 30*a*, a downstream or outlet end 30*b*, and an inner flow passage 32 extending between ends 30*a, b*. Inlet conduit 20 is coupled to cyclone body 30 proximal inlet end 30*a*, and skimmer 50 is coaxially coupled to cyclone body 30 at outlet end 30*b*. Flow passage 32 is defined by a generally cylindrical inner surface 34 defining an inner diameter $D_{30-i}$ for cyclone body 30. In this embodiment, inner diameter $D_{30-i}$ is substantially uniform or constant along the axial length of cyclone body 30. As used herein, the terms "axial" and "axially" may be used to refer to positions, movement, and distances, generally parallel to the central axis (e.g., central axis 35), whereas the terms "radial" and "radially" may be used to refer to positions, movement, and distances generally perpendicular to the central axis (e.g., central axis 35).

As best shown in FIG. 3, cyclone body 30 also includes a vortex finder 60 that extends coaxially from inlet end 30*a* into flow passage 32. Vortex finder 60 is an elongate, generally cylindrical member having a fixed end 60*a* fixed to inlet end 30*a* of cyclone body 30, and a free end 60*b* extending into flow passage 32. In this embodiment, free end 60*b* comprises a conical or pointed tip. Vortex finder 60 is configured and positioned to enhance the formation of a vortex and resulting cyclonic fluid flow within inner flow passage 32.

Referring still to FIGS. 1-3, inlet conduit 20 has a free or inlet end 20*a* distal cyclone body 30, a fixed end 20*b* coupled to cyclone body 30 proximal first end 30*a*, and an inlet flow passage 22 extending between ends 20*a, b*. Inlet conduit 20 may be integral with cyclone body 30 or manufactured separately and connected to cyclone body 30 by any suitable means, including, without limitation, welding, adhesive, interference fit, mating flanges, or combinations thereof. In some embodiments, an O-ring or gasket may be employed to ensure a fluid tight seal at the connection between the inlet conduit and the cyclone body.

Flow passage 22 of inlet conduit 20 is in fluid communication with flow passage 32 of cyclone body 30. In particular, the fluid which contains particulate matter to be separated and collected by cyclone 10, referred to herein as bulk inlet airflow or aerosol 25, enters cyclone 10 via inlet end 20*a* and inlet flow passage 22. Aerosol 25 typically comprises air, the particulate matter to be separated from the air, as well as some particles with relatively low inertia that may be permitted to exit cyclone 10 without being separated and collected. As best shown in FIGS. 1 and 2, inlet conduit 20 is "tangentially" coupled to the side of cyclone body 30 such that aerosol 25 flows through inlet flow passage 22 tangentially (i.e., in a direction generally tangent to the circumference of inner surface 34) into inner flow passage 32 of cyclone body 30. This configuration facilitates the formation of a spiraling or cyclonic fluid flow within inner flow passage 32.

In general, WWC 10 may be designed and configured for operation at any desired bulk inlet air flow rate. However, for most conditions, WWC 10 is preferably designed for operation at an inlet air flow rate of aerosol 25 (sampling flow rate) in the range of from about 30 L/min to about 2000 L/min. Depending on the specific application and environment, WWC 10 may be specifically designed for operation with an air flow rate of 100 L/min, 300 L/min, 400 L/min, or 1250 L/min. Examples 1-4 hereinbelow describe experimental results for a 100 L/min WWC according to this disclosure. Examples 5 and 6 hereinbelow describe experimental results for a 300 L/min WWC according to this disclosure.

Referring still to FIGS. 1-3, collection liquid injector 40 is coupled to inlet conduit 20 and includes an injection tip 41 that extends into, and communicates with, inlet flow passage 22. Collection liquid injector 40 delivers a stream of collection liquid 42 through tip 41 into flow passage 22 and aerosol 25 flowing therethrough. As will be described in more detail below, collection liquid 42 forms a mist of droplets, which in turn, form a film of liquid on part of the inner surface of the cyclone 34. The film serves as a collection surface for the relatively high inertia particles contained in aerosol 25, thereby separating such particles from the gaseous phase of aerosol 25 (e.g., the air).

Collection liquid 42 may be supplied to injector 40 by any suitable means including, without limitation, conduits, supply lines, pumps, or combinations thereof. Further, collection liquid injector 40 may be configured and controlled for continuous or periodic injection of collection liquid 42 into cyclone 10. An effluent liquid flow rate controller may be used to measure air temperature and dew point or relative humidity, calculate required liquid inflow rate from an empirical model, and adjust input collection fluid flow rate to obtain a constant output flow rate. A constant or controlled supply of pressurized air may be utilized for atomization of collection fluid.

In general, collection fluid 42 may comprise any liquid suitable for collecting particulate matter including, without limitation, water, a wetting agent, a surfactant, or combinations thereof. Collection liquid 42 preferably comprises a mixture of water and a small amount of suitable surfactant (e.g., Polysorbate 20, also referred to as Tween 20) added to it to enhance wetting of the collection surface (e.g., inner surface 34) and retention of particulate matter. More specifically, collection fluid 42 preferably comprises a water-surfactant mixture comprising about 0.005% to 0.5% surfactant by volume, and more preferably 0.01% to 0.1% surfactant by volume.

For use in relatively cold environments, collection fluid 42 may comprise solutions including ethylene glycol (i.e., antifreeze) to lower the freezing temperature of collection fluid 42. For use in relatively hot/dry environments, WWC 10 is preferably capable of operating with minimal expenditure or evaporation of collection fluid 42. Without being limited by this or any particular theory, the evaporation of the collection fluid (e.g., collection fluid 42) results, at least in part, from the difference in the vapor pressures of the collection fluid (e.g., collection fluid 42) on the inner wall of the cyclone (e.g., inner surface 34 of WWC 10) and the vapor pressure of the bulk inlet airflow (e.g., aerosol 25). Thus, in some embodiments, the collection fluid (e.g., collection fluid 42) preferably comprises a low vapor pressure liquid. As used herein, the phrase "low vapor pressure" may generally be used to describe a liquid having a vapor pressure less than water at a given temperature. For instance, the collection fluid may comprise a mixture of water and a lower vapor pressure liquid, resulting in a liquid mixture or solution having a vapor pressure less than that of water alone (i.e., a lower vapor pressure collection fluid). In such embodiments where the collection fluid is water-based, the low vapor pressure liquid added to the water is preferably miscible with water. Suitable low vapor pressure liquids include, without limitation, ethylene glycol (EG) and polyethylene glycol, PEG. In certain embodiments, collection fluid 42 comprises a water-based glycol solution (e.g., aqueous ethylene glycol or PEG at a suitable concentration).

In addition to minimizing evaporation, the use of low vapor pressure collection fluid may also offers the potential to reduce the freezing point of the collection fluid below 0° C. As used herein, a fluid having a freezing point below that of water (i.e., below 0° C.) is referred to as a "low freezing point" collection fluid or liquid. For example, if the collection fluid is an ethylene glycol-water mixture, the freezing point would be −16° C. for a 30% ($V_{EG}/V_{total}$) solution and it would be −37° C. for a 50% ($V_{EG}/V_{total}$) solution. Thus, the use of 30% EG as collection fluid may enable operation of the WWC at temperatures as low as perhaps −10° C. without need for heating. In embodiments, collection fluid 42 initially comprises a 10% to 70% water-based EG solution. However, without being limited by this or any particular theory, upon atomization of collection fluid 42 into spray or mist 43, and transport of mist 43 into cyclone body 30, the EG concentration may increased due to preferential evaporation of the water constituent of the droplets. Also, after the mist 43 droplets are deposited on inner surface 34, and further exposed to inlet air 25, and optionally heated inner surface 34, additional evaporation may occur, resulting in a further increase in the EG concentration. Alternatively, if the water vapor pressure in air inlet 25 is greater than that of liquid mist 43 and/or collection liquid 42 on inner surface 34, there may be a slight decrease in EG concentration in the injected collection liquid 42.

As discussed below in Examples 1-4, the use of a low vapor pressure and/or low freezing point collection fluid offers the potential to reduce evaporation losses and increase the operable temperature range of the WWC (i.e., by reducing water evaporation at relatively high temperatures and/or by reducing the freezing point), while not significantly degrading the collection efficiency. In addition, use of a low freezing point collection fluid offers the potential for continuous sampling of a sub-freezing bulk inlet airflow with reduced electrical power needs for heating.

As previously described, one low vapor pressure and low freezing point fluid that may be used as the collection fluid is PEG. PEG is a food additive and is used as an anti foam agent. Also, PEG solutions typically adhere to and wet metals well. A desired molecular weight of PEG may be selected, having viscosity and freezing point depression characteristics compatible with operation of a wetted wall cyclone. In embodiments, the collection fluid (e.g., collection fluid 42) comprises about 10% (by volume) PEG. In alternative embodiments, the collection fluid comprises about 20% (by volume) PEG. In alternative embodiments, the collection fluid comprises about 30% (by volume) PEG.

For separating and collecting biomaterials or bio-organisms, the collection liquid (e.g., collection liquid 42) preferably comprises a biocompatible substance that will not significantly degrade a sample. Example 5 hereinbelow describes the use of a WWC according to an embodiment of this disclosure to sample an *E. coli* aerosol, utilizing a collection fluid comprising water and Tween-20. Viability and DNA intactness were examined. Example 5 illustrates that WWCs of this disclosure may be useful for sampling bacteria in the presence of fine dust, for example, simulating desert storm conditions.

Referring still to FIGS. 1-3, a compressed gas injector 44 is also coupled to inlet conduit 20 and includes an injection tip 45 that extends into, and is in communication with, inlet flow passage 22 proximal collection liquid injection tip 41. Compressed gas injector 44 delivers a stream or blast of compressed gas into flow passage 22 and the stream of collection liquid 42. More specifically, as collection liquid 42 is injected from tip 41, it is impacted by the compressed gas from tip 45, thereby atomizing collection liquid 42 in flow passage 22 to form a mist 43 that is swept up by aerosol 25 and transported through inlet flow passage 22 to inner flow passage 32 of cyclone body 30. The compressed gas may be supplied to injector 44 by any suitable means including, without limitation, conduits, supply lines, pumps, or combinations thereof. Further, compressed gas injector 44 may be configured and controlled for continuous or periodic injection of compressed gas into cyclone 10. In general, the compressed gas may comprise any suitable gas including, without limitation, compressed air, compressed nitrogen, or combinations thereof.

In this embodiment, collection liquid 42 is injected and atomized within flow passage 22, and is carried to cyclone body 30 by aerosol 25. However, in general, the collection liquid (e.g., collection liquid 42) may be injected and/or atomized at any suitable location within the wetted wall cyclone (e.g., cyclone 10) including, without limitation, injection of the collection liquid into the aerosol stream proximal the juncture of the cyclone inlet and the cyclone body.

Referring still to FIGS. 1-3, skimmer 50 extends partially into outlet end **30*b* of cyclone body 30. More specifically, skimmer 50 has a separation end 50*a* disposed in cyclone body 30, a free end 50*b* distal cyclone body 30, and an inner exhaust or outlet passage 55 extending between ends 50*a*, *b*. Outlet passage 55 is in fluid communication with flow passage 32**.

Figure 4:
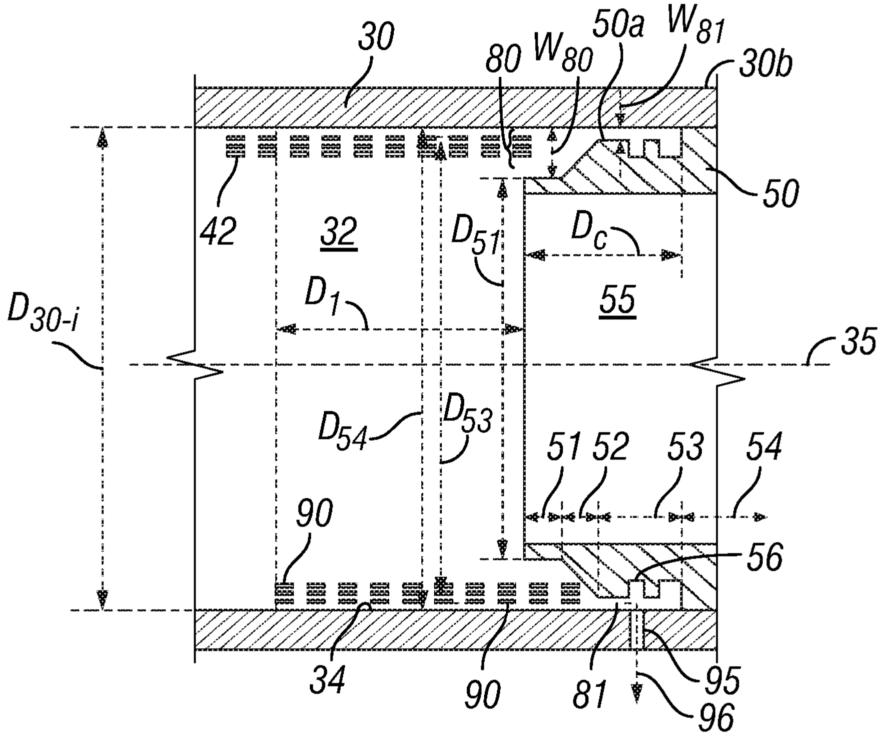
FIG. 4 is an enlarged partial cross-sectional view of the connection between the cyclone body and the skimmer of the wetted wall cyclone system of FIG. 1.

The gaseous component(s) of aerosol 25 (e.g., air) and the relatively low inertia particulate matter in aerosol 25 not entrained in collection liquid 42, collectively referred to herein as bulk outlet airflow 70, exit cyclone 10 via exhaust passage 55. As will be explained in more detail below, the relatively high inertia particulate matter in aerosol 25 is separated from aerosol 25 and entrained within the layer or rivulets of collection liquid 42 formed along inner surface 34, and thus, does not exit cyclone 10 via exhaust passage 55. Rather, as shown in FIG. 4, the combination of collection liquid 42 and the entrained particulate matter separated from aerosol 25, collectively referred to herein as a hydrosol 90, exits cyclone 10 via an aspiration port 95 in cyclone body 30 proximal outlet end **30*b*. It should be appreciated that during the course of transit of collection liquid 42 through cyclone 10 from injector 40 to aspiration port 95, there may be some loss of collection liquid 42 due to evaporation or gain in collection liquid 42 by condensation. And further, the local flow rate of collection liquid 42 at various points within cyclone 10** may vary somewhat due to evaporation or condensation.

Referring still to FIGS. 1-3, a pressure differential between exhaust passage 55 and inlet flow passage 22 facilitates the flow of fluids through cyclone 10 from inlet conduit 20 through cyclone body 30 to skimmer 50. The pressure differential may be created by any suitable device including, without limitation, a fan, pump, a blower, suction device, or the like. Such a device is typically positioned downstream of cyclone 10, but in some applications, may be positioned upstream of cyclone 10. Alternatively, the bulk airflow 25 in flow passage 22 may be pressurized relative to exhaust passage 55 of skimmer 50, tending to force fluid flow through cyclone 10.

Referring now to FIG. 4, an enlarged cross-sectional view of the region of overlap between cyclone body 30 and skimmer 50 is shown. Moving axially along skimmer 50 from separation end **50*a*, the portion of skimmer 50 disposed within cyclone body 30 includes an upstream or leading section 51, a transition section 52, a recessed or intermediate section 53, and a downstream or coupling section 54. Leading section 51 extends axially from separation end 50*a* to transition section 52, transition section 52 extends axially from leading section 51 to recessed section 53, recessed section 53 extends from transition section 52 to coupling section 54, and coupling section 54 extends axially from recessed section 53. Recessed section 53 meets coupling section 54 at an axial distance $D_c$ measured from separation end 50*a***.

Sections 51, 52, 53 are each radially spaced from inner surface 34, whereas coupling section 54 engages inner surface 34, thereby coupling skimmer 50 to cyclone body 30. The coupling between skimmer 50 and cyclone body 30 between coupling section 54 and inner surface 34 may be achieved by any suitable means including, without limitation, mating threads, welded joint, an interference fit, or combinations thereof. Preferably a 360° fluid tight seal is formed between coupling section 54 of skimmer 50 and inner surface 34 of cyclone body 30 along at least a portion of the axial length at which they are connected. In some embodiments, a seal or O-ring may be provided between inner surface 34 and skimmer 50 to form such a fluid tight seal.

Leading section 51 has an outer diameter $D_{51}$, recessed section 53 has an outer diameter $D_{53}$ that is greater than diameter $D_{51}$, and coupling section 54 has an outer diameter $D_{54}$ that is greater than diameter $D_{53}$. Transition section 52 has a generally frustoconical or sloped outer surface that transitions from diameter $D_{51}$ to diameter $D_{53}$. Thus, the outer diameter of skimmer 50 at any point along transition section 52 is generally between diameter $D_{51}$ to diameter $D_{53}$. As previously described, sections 51, 53 are radially spaced from inner surface 34, and thus, outer diameters $D_{51}$, $D_{53}$ are each less than inner diameter $D_{30\text{-}i}$. Coupling section 54 engages cyclone body 30, and thus, diameter $D_{54}$ is substantially the same or slightly less than the inner diameter $D_{30\text{-}i}$ of cyclone body 30. In other embodiments, diameter $D_{54}$ is slightly larger than the inner diameter $D_{30\text{-}i}$ to ensure a snug interference fit.

Referring still to FIG. 4, the outer surface of recessed section 53 includes an annular groove or recess 56 axially spaced from leading section 51. Annular groove 56 is axially aligned with and opposes aspiration port 95, which extend radially through cyclone body 30 in the region of overlap between cyclone body 30 and skimmer 50.

As previously described, leading section 51 is radially spaced from inner surface 34, resulting in the formation of an annulus 80 between leading section 51 and cyclone body 30. Annulus 80 is in fluid communication with flow passage 32 and provides a flow path for the hydrosol 90 moving axially along inner surface 34. The radial width $W_{80}$ of annulus 80 depends, at least in part, on the size of cyclone 10 and the expected aerosol flow rates and velocities, but is preferably sufficient to allow passage of a hydrosol 90 that moves axially along inner surface 34, while allowing sufficient shear forces to be exerted on hydrosol 90 by spiraling aerosol 25 within inner flow passage 32. In particular, the radial width $W_{80}$ of annulus 80 is preferably between 3% and 15% of the inside diameter $D_{30\text{-}i}$, and more preferably between 4% and 10% of the inside diameter $D_{30\text{-}i}$. For most applications, the radial width $W_{80}$ of annulus 80 is preferably greater than 0.03 inches.

Further, as previously described, recessed section 53 is radially spaced from inner surface 34, resulting in the formation of an annulus 81 between recessed section 51 and cyclone body 30. Annulus 81 is in fluid communication with annulus 80, inner flow passage 32, and aspiration port 95. Hydrosol 90 moving axially along inner surface 34 moves through annulus 80 and annulus 81 to aspiration port 95 where it is collected. The radial width $W_{81}$ of annulus 81 depends, at least in part, on the size of cyclone 10 and the expected aerosol flow rates and velocities, but is preferably sufficient to allow passage of a hydrosol 90 that moves axially along inner surface 34, while allowing sufficient shear forces to be exerted on hydrosol 90 by spiraling aerosol 25 within inner flow passage 32. In particular, the radial width $W_{81}$ of annulus 81 is preferably between 0.15% and 2.5% of the inside diameter $D_{30\text{-}i}$. For most applications, the radial width $W_{81}$ of annulus 81 is preferably between about 0.003 inches and 0.010 inches.

Referring now to FIGS. 3 and 4, to operate wetted wall cyclone 10, a pressure differential is created between inlet conduit 20 and skimmer 50. In particular, exhaust passage 55 of skimmer 50 is preferably maintained at a lower pressure than inlet passage 22 of inlet conduit 20, thereby facilitating the flow of aerosol 25 into inlet conduit 20 and through inlet passage 22 to inner flow passage 32. Aerosol 25 flows tangentially into flow passage 32 and is partially aided by vortex finder 60 to form a cyclonic or spiral flow pattern within inner flow passage 32 of cyclone body 30. As aerosol 25 spirals within flow passage 32, it also moves axially towards skimmer 50 under the influence of the pressure differential across cyclone 10.

Periodically, or continuous with the flow of aerosol 25, collection liquid injector 40 introduces collection liquid 42 into inlet passage 22. Simultaneous with injection of collection liquid 42, compressed gas from gas injector 44 impacts the stream of collection liquid 42 to form a mist 43 of collection liquid 42 in passage 22. The mist 43 is swept up and carried by the flow of aerosol 25 through inlet passage 22 to flow passage 32 of cyclone body 30. Depending on the orientation of cyclone 10, gravity may also aid the movement of mist 43 into flow passage 32. The individual droplets of collection liquid 42 in mist 43 tend to move towards inner surface 34 as a result of their inertia and the curvature of inner surface 32. Movement of droplets towards surface 34 is assisted by centrifugal force. As droplets of collection liquid 42 strike inner surface 34, they form a liquid film on a portion of inner surface 34. The film on inner surface 34 may have a radial thickness on the order of a few micrometers. The cyclonic and axial movement of aerosol 25 through flow passage 32 exerts shear forces on the film of collection liquid 42, thereby urging collection liquid 42 axially along inner surface 34 towards skimmer 50. Through the action of surface tension in the liquid and shear forces from the gas phase of the aerosol 25, the liquid film may break into rivulets or small flow elements, which have a thickness on the order of tens of micrometers, that flow along inner surface 34 towards annulus 80.

Similar to collection liquid 42, upon entry into curvilinear flow passage 34, the particulate matter in aerosol 25 having sufficient inertia begin to separate from the gaseous phase of aerosol 25 and move radially towards inner surface 34 and collection liquid 42 disposed along inner surface 34. Eventually these particles strike collection liquid 42 disposed on inner surface 34, and become entrained in the film of collection liquid 42. The remaining relatively lower inertia particles and the gaseous phase of aerosol 25 continue their cyclonic flow in flow passage 32 as they move axially towards skimmer 50 and eventually exits cyclone 10 via exhaust passage 55 as bulk outlet airflow 70. Thus, the relatively large particles and collection liquid 42 tend to accumulate on inner surface 34 as hydrosol 90, while the relatively small particles in aerosol 25 and the gaseous phase of aerosol 25 forming bulk outlet airflow 70 tend to remain radially inward of collection liquid 42, but also move axially toward skimmer 50. In this manner, particulate matter in aerosol 25 with sufficient inertia is separated from aerosol 25 and captured in collection liquid 42 to form hydrosol 90.

In some applications of cyclone 10, high inertia, larger particles are defined as particles having sizes greater than or equal to about 1 μm aerodynamic diameter, while smaller, low inertial particles are defined as particles having sizes less than about 1 micrometer aerodynamic diameter. As used herein, aerodynamic diameter is the diameter of a sphere of unit specific gravity (1000 kg/$m^3$) that has the same gravitational settling velocity in air at 20° C. and a pressure of 1 atm, as the particle in question. It should be appreciated that the size and geometry of the wetted wall cyclone and the volumetric flow rate of the aerosol through the wetted wall cyclone may be varied to increase or decrease the size of the particles separated by the wetted wall cyclone (e.g., cyclone 10). For example, a particular sized and mass particle may have insufficient inertia for separation at a first aerosol volumetric flow rate, but have sufficient inertia for separation at a second aerosol volumetric flow rate that is greater than the first aerosol volumetric flow rate.

As previously described, the particulate matter separated from aerosol 25 becomes entrained within collection liquid 42 along inner surface 34 to form hydrosol 90. Hydrosol 90 moves axially along inner surface 34 towards skimmer 50 as a film, or a plurality of rivulets and small flow elements. Similar to collection liquid 42, the axial movement of collection liquid 42 and hydrosol 90 along inner surface 34 of cyclone body 30 is primarily driven by shear forces exerted by the gas phase of the aerosol 25 as it spirals inside cyclone body 30 towards skimmer 50. Depending on the orientation of cyclone 10, gravity may also be leveraged to enhance the axial flow of collection liquid 42 and hydrosol 90 along inner surface 34.

Hydrosol 90 continues to move axially along inner surface 34 through annulus 80 and annulus 81 into annular groove 56. Suction is provided to aspiration port 95 to collect hydrosol 90 from annular groove 56. Thus, hydrosol 90 collected in annular groove 56 is extracted from cyclone 10 via aspiration port 95. Following collection, hydrosol 90 may be passed along to other apparatus for further processing or analysis. As compared to the concentration of particulate matter in aerosol 25, the concentration of particulate matter in hydrosol 90 is significantly greater. In some embodiments of cyclone 10, the effluent volumetric flow rate of hydrosol 90 through aspiration port 95 is about one millionth that of the aerosol 25 inflow rate. For example, in embodiments, the sampling air flow rate is 300 L/min and the liquid outflow rate is about 300 μL/min. Consequently, in such embodiment, the concentration of particulate matter in hydrosol 90 is significantly greater than the concentration of particulate matter in aerosol 25.

In many conventional wetted wall cyclones, the cyclone body includes an expanded section adapted to receive the liquid skimmer. The expanded geometry proximal the liquid skimmer results in a diverging flow region and localized airflow deceleration in the axial direction, which may result in a buildup of a relatively stagnant toroidal-shaped mass of the hydrosol proximal the liquid skimmer and associated liquid carryover. To the contrary, in this embodiment of cyclone 10, the inner diameter $D_{30\text{-}i}$ of cyclone body 30 is substantially uniform. As a result, divergent flow, and associated axial flow deceleration, within flow passage 32 is reduced as compared to some conventional wetted wall cyclones that include an expanded section proximal the leading edge of the skimmer. By reducing the potential for axial flow deceleration, the likelihood of hydrosol stagnation proximal the skimmer is reduced. In this manner, embodiments of cyclone 10 offer the potential for reduced liquid carryover, an increased aerosol-to-hydrosol collection efficiency, and an increased concentration factor as compared to some conventional wetted wall cyclones. For example, embodiments of cyclone 10 offer the potential for aerosol-to-hydrosol collection efficiencies greater than about 75%, and a concentration factor of between 500,000 and 1,500,000 when cyclone 10 is operated with continuous injection of collection liquid 42. As described in more detail below in Example 1, an embodiment of the wetted wall cyclone separator 10 provides aerosol-to-hydrosol efficiency values of about 80% and concentration factors of about 750,000 for the particle size range of 1-8 μm AD. Other embodiments of wetted wall cyclone separator 10 offer the potential to achieve even higher aerosol-to-hydrosol collection efficiencies (on the order of 90%) and concentration factors between 500,000 and 1,500,000. As used herein, the phrase "aerosol-to-hydrosol collection efficiency" may be used to refer to the ratio of the rate at which particles of a given size leave the cyclone separator in the hydrosol effluent stream to the rate of at which particles of that same size (e.g., aerodynamic diameter) enter the cyclone in the aerosol state. Further, as used herein, the phrase "concentration factor" may be used to refer to the ratio of the number concentration of aerosol particles of a given size (e.g., aerodynamic diameter) in the effluent hydrosol (e.g., effluent hydrosol 95) to the number concentration of aerosol particles of that same size in the inlet aerosol (e.g., aerosol 25). The number concentration of particles of a given size in the aerosol is the number of particles of that size per unit volume of aerosol (e.g., 10 particles per liter of aerosol, 25 cells per liter of aerosol, etc.), and the number concentration of particles of a given size in the hydrosol is the number of particles of that size per unit volume of hydrosol (e.g., 10 million particles per liter of hydrosol, 25 million cells per liter of hydrosol, etc.). The number concentration of particles of a given size in the aerosol may be calculated by dividing the rate of at which particles of that same size enter the cyclone in the aerosol state by the aerosol flow rate, and the number concentration of particles of a given size in the hydrosol may be calculated by dividing the rate at which particles of a given size leave the cyclone separator in the hydrosol effluent stream by the hydrosol flow rate.

Although cyclone body 30 is described as having a substantially uniform inner diameter $D_{30\text{-}i}$ along its entire axial length, a uniform inner diameter in the cyclone body (e.g., cyclone body 30) is particular preferred within an axial distance $D_1$ of skimmer 50, where distance $D_1$ is at least 50% of the inner diameter $D_{30\text{-}i}$ of cyclone body 30. Further, in other embodiments, the cyclone body (e.g., cyclone body 30) may include a slight convergence or divergence. However, to reduce the likelihood of axial flow deceleration and associated liquid carryover, the inner surface of the cyclone body (e.g., inner surface 34) is preferably oriented at an angle $\alpha$ (FIG. 4) that is less than or equal to about +/−6° relative to the central axis of the cyclone body (e.g., central axis 35). Negative angles of $\alpha$ (converging), particularly within the distance $D_1$ would provide acceleration of the gas phase of the aerosol 25 and thereby reduce the potential for liquid carryover. It should be appreciated that angle $\alpha$ is about zero for cyclone bodies with a substantially uniform diameter.

It should also be appreciated that leading section 51 offers a physical barrier disposed radially between hydrosol 90 moving axially within annulus 80 and bulk outlet airflow 70 in exhaust passage 55, while permitting continued shearing action to be exerted on hydrosol 90 by the spiraling aerosol 25 and bulk outlet airflow 70. More specifically, annulus 80 and its increased radial width $W_{80}$, as compared to annulus 81 and its radial width $W_{81}$, allows continued shearing action on hydrosol 90 while leading section 51 simultaneously shields hydrosol 90 from the bulk outlet airflow 70 in exhaust passage 55. It is believed that this feature also contributes to reduced liquid carryover, and increased aerosol-to-hydrosol collection efficiency.

To minimize reliance on a continuous fresh supply of collection fluid 42, in some embodiments, WWC 10 further comprises a liquid recycling system. Particulate matter may be removed or filtered from aspirated hydrosol 96, yielding a "clean" solution that may be re-injected into WWC 10 via injector 46. Particulate matter may be removed from aspirated hydrosol 96 by any suitable means, including, without limitation, filtration and centrifugation. If necessary, soluble contaminants may also be removed from aspirated hydrosol 96 prior to recycle.

In embodiments where collection fluid 42 comprises a certain concentration of a low vapor pressure fluid and/or a low freezing point collection fluid (e.g., ethylene glycol), the concentration of the solution may be controlled, for example, by sensing the specific gravity and temperature of the cleaned solution and calculating the glycol concentration. Additional amounts of diluent or solute (e.g., concentrated glycol solution) may be added prior to recycle to system 10.

In some cases, it may be desirable to employ a wetted wall cyclone system (e.g., cyclone system 10) in a sub-freezing environment or in relatively hot-dry conditions. For instance, embodiments of sampling systems described herein may have an operational inlet air temperature anywhere from about −30° C. to about 50° C. Without being limited by this or any particular theory, numerical analyses conducted on wetted wall cyclones at Texas A&M University have shown that the liquid film formed by hydrosol 90 in a cyclone is very thin, so the temperature of the liquid film is essentially that of the wall. Therefore, for sub-freezing or relatively hot-dry conditions, heating or cooling of at least a portion of the system (e.g., system 10) optionally in combination with a low vapor pressure and/or low freezing point collection fluid 42 may be used potentially enhance the collection efficiency, maintain bioactivity, and/or minimize the use of wetting agent.

For instance, sampling and analysis of air for airborne biological agents or chemical agents may be desirable in locations subject to below-freezing temperatures. However, if the collection fluid or hydrosol containing the collection fluid and entrained particulate matter begin to solidify, the effectiveness of the wetted wall cyclone may decrease significantly. Thus, in some embodiments, the collection fluid (e.g., collection fluid 42) may also include a compound, as described hereinabove that decreases the freezing point of collection fluid 42. Further, in embodiments employing air blast atomization to create a mist 43 of collection fluid 42, it is preferred that the droplets forming mist 43 are sufficiently large such that they will not freeze when they contact the aerosol 25. For use with an aerosol 25 having a temperature as low as −32° C., the size of the droplets forming mist 43 are preferably greater than 40 μm in diameter. In addition to, or as an alternative to, forming relatively large droplets of collection fluid 42, it may be desirable to increase the temperature of the wetted wall cyclone system to reduce the likelihood of solidification of collection fluid 42 and hydrosol 90. However, in applications involving collection and analysis of biological materials or organisms, preferably the added thermal energy does not create hot spots that could potentially damage such biological materials.

Figure 5:
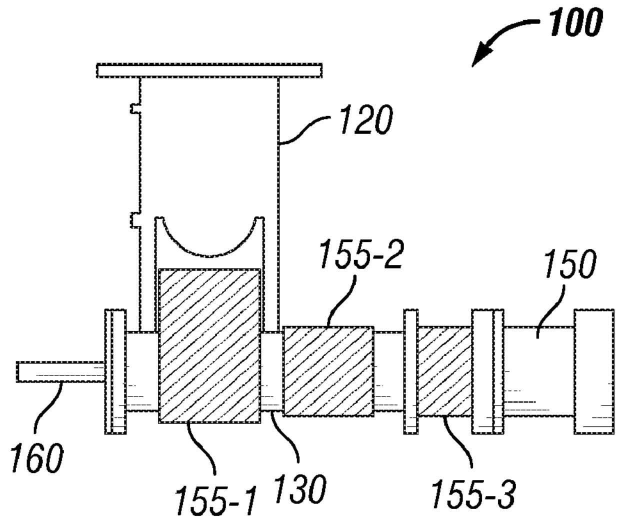
FIG. 5 is a side view of another embodiment of a wetted wall cyclone system including a plurality of heaters.
Figure 6:
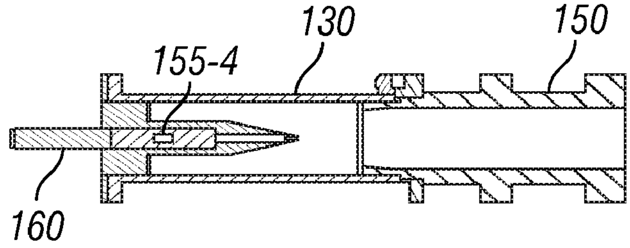
FIG. 6 is a partial cross-sectional view of the cyclone body and the skimmer of the wetted wall cyclone system of FIG. 5.

Referring now to FIGS. 5 and 6, another embodiment of a wetted wall cyclone 100 is shown. Cyclone 100 is substantially the same as system 10 previously described. Namely, cyclone 100 comprises a cyclone inlet 120, a cyclone body 130, a liquid injector (not shown), a vortex finder 160, and a skimmer 150. However, in this embodiment, a plurality of heaters 155-1, 155-2, 155-3 are coupled to specific locations along the outside of cyclone 100, and a heater 155-4 is provided in vortex finder 160. In general, the heaters (e.g., heaters 155-1, 155-2, 155-3, 155-4) may comprise any suitable device capable of providing thermal energy to cyclone 100. Preferably each heater comprises an electric heating device with an adjustable heat output/intensity (i.e., the thermal output of each heater can be individually controlled and adjusted).

Heater 155-1 extends around the outer surface of cyclone body 130 and over the lower portion of cyclone inlet 120; heater 155-2 is positioned around the outer surface of cyclone body 130 proximal skimmer 150; heater 155-3 is disposed about skimmer 150 proximal cyclone body 130; and heater 155-4 extends coaxially into vortex finder 160. Consequently, by adjusting the thermal output of each heater 155-1, 155-2, 155-3, 155-4 independently, the temperature of cyclone body 130 proximal cyclone inlet 120, the temperature of cyclone body 130 proximal skimmer 150, the temperature of skimmer 150 proximal cyclone body 130, and the temperature of vortex finder 160, respectively, may be independently controlled via conductive heat transfer. Likewise, the temperatures of the fluids and particulate matter (e.g., aerosol, hydrosol, collection liquid, particulate matter, bulk outlet flow, etc.) in proximity to the inner walls within each of these different regions of cyclone 100 may be independently controlled via conductive and convective heat transfer.

Without being limited by this or any particular theory, the fluids and particulate matter moving through cyclone 100 attain different local velocities in different regions of cyclone 100 due to the relatively complex geometry of cyclone 100 and resulting flow patterns. The variations in local velocities within cyclone 100 result in different local turbulent heat transfer coefficients in the different regions of cyclone 100. In some conventional wetted wall cyclones that include only a single heater to control the temperature of wetted wall cyclone, hot spots and/or cold spots can develop on the cyclone body due to the varying local turbulent heat transfer coefficients. Such hot or cold spots may damage biological agents or bio-organism within the hydrosol, or result in solidification of the injected liquid or hydrosol along certain regions of the cyclone body. However, embodiments of wetted wall cyclone 100 include a plurality of heaters (e.g., heaters 155-1, 155-2, 155-3, 155-4) positioned at different regions of cyclone 100 that offer the potential to preclude these problems. Heaters 155 may be independently controlled and adjusted to obtain the desired temperature within each particular region of cyclone 100 (e.g., at cyclone inlet 120, at vortex finder 160, within cyclone body 130, within skimmer 150, etc.), thereby offering the potential to reduce the formation of hot spots and cold spots within cyclone 100, and also offer the potential for effective and efficient use in sub-freezing environments. For instance, embodiments of cyclone 100 offer the potential for effective use at temperatures as low as −40° C. Preferably, the heaters (e.g., heaters 155-1, 155-2, 155-3, 155-4) provide sufficient thermal energy to eliminate cold spots with temperatures at or below the freezing point of the collection liquid (e.g., collection liquid 42), but do not generate hot spots with temperatures greater than about 50° C., which may otherwise damage bio-organisms. Still further, it is believed that incorporation multiple heaters, and their independent control, may offer the potential for reduced energy consumption for cyclone 100 as compared to a conventional wetted wall cyclone system employing a single relatively large heater.

Although four heaters 155 are shown in FIGS. 5 and 6, in general, any number of heaters (e.g., heaters 155) may be employed to independently control different regions of wetted wall cyclone 100. In addition, in some embodiments, sensors and/or a control loop feedback system may also be employed to independently monitor and control the temperature of each portion of cyclone 100 and fluids contained therein.

Figure 7:
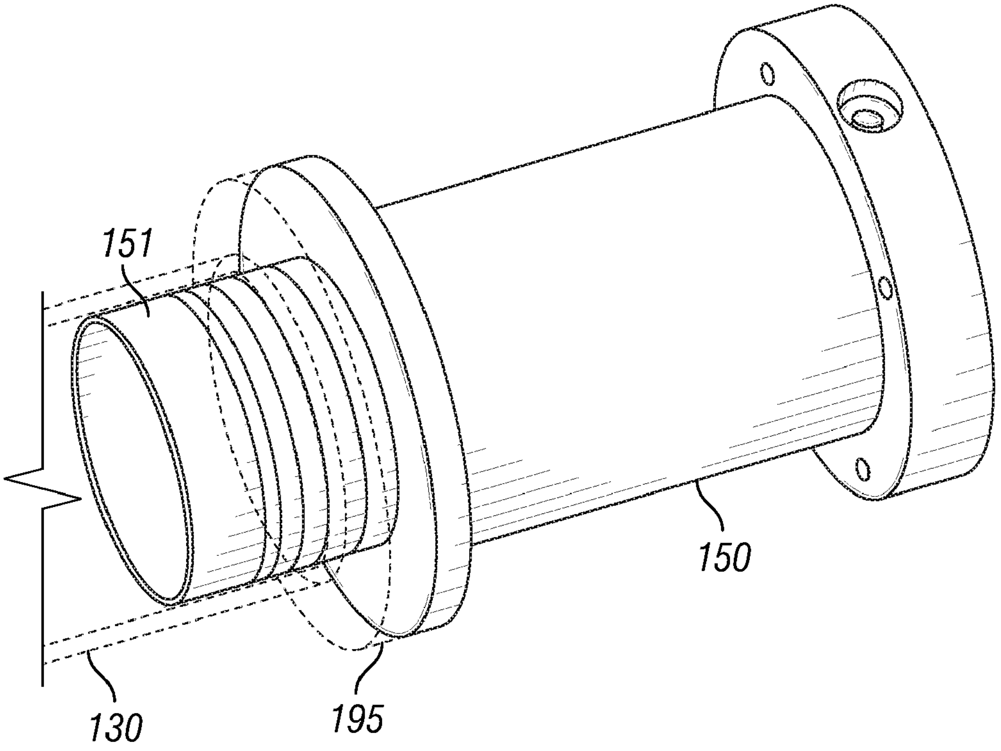
FIG. 7 is a partial perspective view of the cyclone body and the skimmer of the wetted wall cyclone system of FIG. 5.

Referring now to FIG. 7, a partial perspective view of wetted wall cyclone 100 previously described is shown. In particular, skimmer 150 and cyclone body 130 (shown in phantom) coupled to skimmer 150 are shown. Skimmer 150 includes a reduced diameter leading section 151 substantially the same as leading section 51 previously described. Leading section 151 extends into cyclone body 130, but is radially offset from cyclone body 130, resulting in the formation of an annulus therebetween.

Controlling the temperature of leading section 151 may be of particularly important because the physical separation and collection of hydrosol 90 and remaining bulk outlet airflow 70 occurs in the general region of leading section 151. However, controlling the temperature of leading section 151 a heater coupled to the outside of cyclone 100 (e.g., heater 155-2, 155-3) may be challenging because leading section 151 is thermally shielded by cyclone body 130 and the annulus between cyclone body 130 and leading section 151. However, contrary to some conventional wetted wall cyclone systems including skimmers made of a relatively low thermal conductivity materials, in this embodiment, skimmer 150, including leading section 151, preferably comprise a material with a thermal conductivity preferably greater than about 110 W/($m^2$ K). Suitable materials with a relatively high thermal conductivity for use in manufacturing skimmer 150 include, without limitation, aluminum, copper, brass, and alloys created therefrom. With the usage of such materials for skimmer 150, leading section 151 extending into cyclone body 130, but radially offset from cyclone body 130, can be sufficiently heated by heater 155-3 via conductive heat transfer. Such heating of leading section 151 may be achieved without heating the remaining portions of skimmer 150 to a temperature which may damage biological agents. In some embodiments, the tip of leading section 151 can be heated to a temperature above 0° C. via conductive heat transfer from heater 155-3 through skimmer 150, without the temperature of skimmer 150 exceeding a temperature suitable for preserving important properties (e.g., viability, DNA integrity, etc.) of bioaerosol particles. Although materials exhibiting relatively high thermal conductivities allow for improved heat transfer from the heaters (e.g., heaters 155-1 to 155-4), it should be appreciated that one or more heaters may also be employed in cyclones and/or cyclone components comprising relatively low thermal conductivity materials such as plastics.

In embodiments, for cold weather operation of wetted wall cyclone system 10, electrical heating on the cyclone body is used to prevent the liquid from freezing. In embodiments, a WWC of this disclosure enables sampling of air at −32° C. with a 100 L/min cyclone wetted wall cyclone, with no evidence of liquid freezing via addition of a total of 30 W of electrical heating through six heaters on the cyclone wall and vortex finder 40. In embodiments, a WWC of this disclosure enables sampling of air at −22° C. with a 1250 L/min cyclone wetted wall cyclone, with no evidence of liquid freezing via addition of a total of 350 W of electrical heating.

When conventional wetted wall cyclones are used to sample air at sub-freezing temperatures, it is necessary to heat the cyclone to prevent freezing of the collection liquid on internal surfaces. This requires electrical power, which for remotely operated samplers may be limited. In embodiments, the use of heating is minimized by the apparatus and methods of the present disclosure by the use of an ingredient in the collection fluid (e.g., ethylene glycol) that reduces the freezing point of the collection fluid. In some embodiments, a collection fluid comprising a low freezing-point collection fluid minimizes or eliminates the need for heating of a sampling system to prevent solidification of fluids. In embodiments, operation of a WWC at a temperature equal to or less than −10° C. is enabled by the use of collection fluid 42 comprising a 30% (by volume) solution of EG, which has a freezing temperature of −16° C. Sampling of air at temperatures lower than about −10° C. would only require heating the inner surface of the cyclone body, the vortex finder, and the skimmer to about −10° C. rather than to the normal freezing point of water, and thus would require less power than a heated system that used water as the collection fluid.

The conventional strategy for maintaining a constant liquid output flow rate when sampling relatively hot-dry air is to simply increase the liquid flow rate to account for evaporation. For example, with the 1250 L/min cyclone it is typically desirable to operate with a liquid effluent flow rate of 1.0 mL/min; at typical room temperature and humidity conditions, this may be achieved by providing a liquid inflow rate to the cyclone of 1.6 mL/min. For a 100 L/min cyclone operated at room conditions, the desired output liquid flow of 0.1 mL/min may be achieved by inputting about 0.15 mL/min. In contrast, some conventional wetted wall cyclone designs, which operate at about 900 L/min and have a design liquid output flow rate of about 1.5 mL/min, require as much as 6 mL/min liquid input during operation in relatively hot dry conditions.

For some applications, the use of liquid makeup to account for evaporation is a suitable approach. However, for other applications, such as sampling in a remote area, it may be desirable to minimize the consumption of expendable supplies, and thus, use of makeup liquid may not be a particularly attractive option. Because the evaporation of liquid from the cyclone wall into the air stream is affected by the difference in vapor pressure between the liquid at the wall and that in the core gas, cooling the wall offers a potential means of reducing evaporation. Thus, in some embodiments of a WWC described herein, cooling of at least a portion of the cyclone wall, rather than the addition of makeup liquid, is used to accommodate evaporation for relatively hot, dry weather conditions.

Figure 8A:
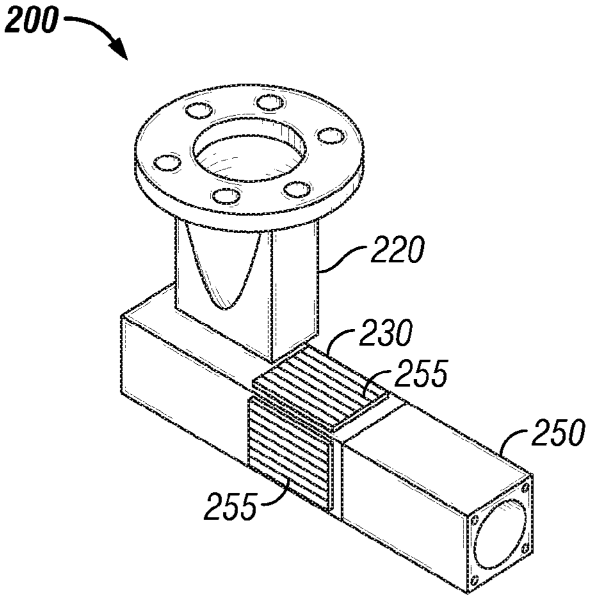
FIG. 8A is perspective view of an embodiment of a wetted wall cyclone system.
Figure 8C:
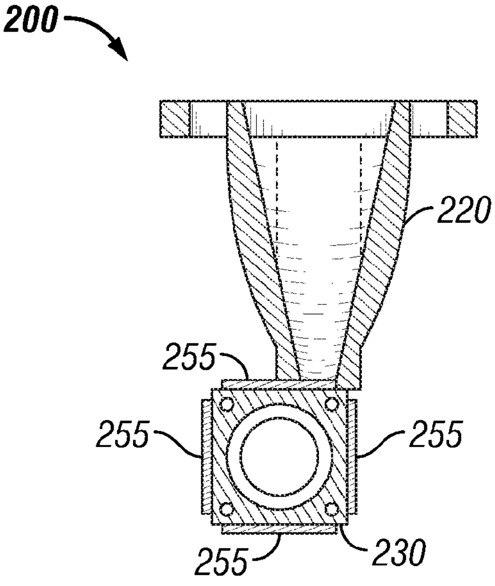
FIG. 8C is a partial cross-sectional end view of the wetted wall cyclone system of FIG. 8A.
Figure 8B:
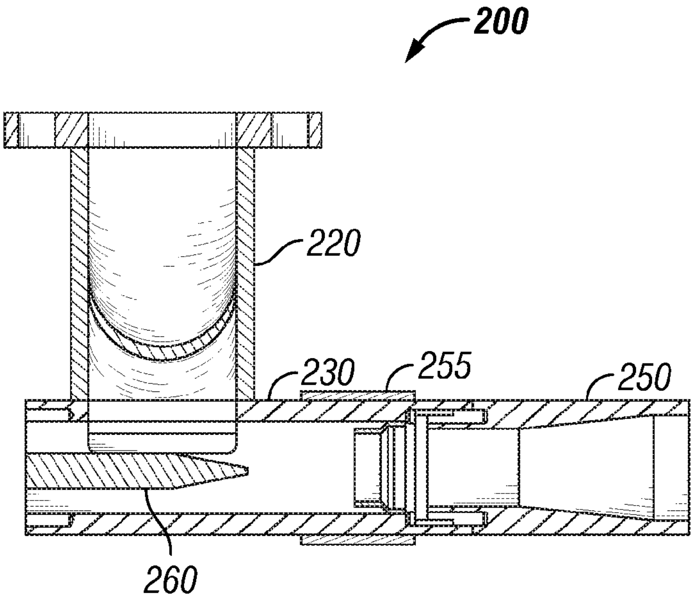
FIG. 8B is a cross-sectional view of the wetted wall cyclone system of FIG. 8A.

Referring now to FIGS. 8A-8C, another embodiment of a wetted wall cyclone system 200 is shown. System 200 is similar to systems 10, 100 previously described. System 200 comprises a cyclone inlet 220, a cyclone body 230, a liquid injector (not shown), a skimmer 250, and a vortex finder 260. However, in this embodiment, cyclone body 230 and skimmer 250 each have four generally planar, rectangular outer surfaces. In addition, in this embodiment, a plurality of thermoelectric cooling (TEC) devices 255 are coupled to system 200, and more particularly, to each of the four planar outer surfaces of cyclone body 230. TEC devices 255 serve to cool the walls of cyclone body 230 between inlet 220 and skimmer 250 when the temperature of the air being sampled is greater than 0° C. In general, thermoelectric coolers 255 may comprise any suitable device capable of removing thermal energy from system 200 including, without limitation, TEC modules commercially available from Melcor Corporation of Trenton, N.J. TEC devices 255 may be independently controlled and adjusted to obtain the desired temperature for cyclone body 230, thereby offering the potential for effective and efficient use in relatively hot-dry environments.

Thermoelectric cooling devices are used to create a refrigeration effect directly from electrical energy. If the current flow through a thermoelectric cooling device is reversed, a heating effect is produced. Thus, when the temperature of the sampled air is less than approximately the freezing point of the collection liquid, TEC devices 255 may provide thermal energy to heat body 230 by reversing the current flow through the TEC devices. System 200 may operate with either water as the collection liquid or a water-based low vapor pressure and/or low freezing point collection fluid, which reduces evaporation, depresses the freezing point, and is compatible with important contemporary techniques for sample analysis.

TEC devices 255 are preferably employed to maintain at least a portion of the liquid-wetted areas of the inner cylindrical wall of the cyclone body (e.g., cyclone body 230) at, or below, the dew point temperature of the incoming air, yielding substantially no net evaporation. To maintain the liquid-wetted areas of the inner cylindrical wall of the cyclone body at, or below, a particular temperature, the TEC devices are coupled to the cyclone body (e.g., cyclone body 230). In other words, for cooling the inner cylindrical wall of the cyclone body, the inlet (e.g., inlet 220), the skimmer (e.g., skimmer 250), and the vortex finder (e.g., vortex finder 260) may not require TEC devices. In some applications, at least a portion of the liquid-wetted areas of the inner cylindrical wall of the cyclone body is maintained at about 4° C., reducing net evaporation. When maintenance of one or more biological materials in the aerosol is desired, at least a portion of the liquid-wetted areas of the inner cylindrical wall of the cyclone body is preferably maintained at a temperature less than the temperature of the incoming air and at which the viability of any biological materials is preserved (generally, less than about 40° C. for many types of bacteria).

For use in relatively hot-dry environments, at least a portion of the inner cylindrical wall of the cyclone body is maintained at a temperature approximating the dew point through use of thermoelectric cooling. As only the air in, and near, the boundary layer needs to be cooled to reduce the evaporation losses and not the bulk flow, the electrical cooling load is not prohibitive. During cold weather operation, there may be no need for cooling or heating when the collection fluid comprises antifreeze. In embodiments, the use of low vapor pressure collection fluid in a reduced temperature liquid film on the cyclone wall reduces evaporation losses.

Cooling of at least a portion of the inner cylindrical wall of the cyclone body as described herein offers the potential for reduced consumption of liquid that is used as the collection fluid, with the reduction being particularly substantial if the air being sampled is relatively hot and dry. In embodiments, operation of a WWC according to this disclosure with cyclone wall cooling provides substantially equivalent and potentially improved collection efficiencies compared with non-cooled WWCs. Example 2 hereinbelow presents the effect of cyclone wall cooling on evaporation rate. In embodiments, cooling of at least a portion of cyclone wall offers the potential to reduce liquid consumption (defined as evaporation), by as much as 80%.

Although four TEC devices 255 are employed in the embodiment of cyclone 200 shown in FIGS. 8A-8C, in general, the number of TEC devices (e.g., TEC devices 255) may be limited and/or reduced by employing materials with a relatively high thermal conductivity (greater than about 110 $W/(m^2 K)$) to enhance heat transfer between the TEC devices and the cyclone body (e.g., cyclone body 230). Suitable materials with a relatively high thermal conductivity for use in manufacturing skimmer 150 include, without limitation, aluminum, copper, brass, and alloys created therefrom.

As shown in FIGS. 8A-8C, TEC devices 255 are provided on the outer surfaces of cyclone body 230. However, in other embodiments, one or more TEC devices may also be employed to refrigerate or cool a collected sample. Such embodiments may be particularly well suited to remote locations where the collected sample is analyzed periodically, and is susceptible to damage from a hot and/or dry environment while awaiting analysis.

The "liquid conservation concept" described herein may be utilized with sampling systems other than the continuous, i.e. near real-time, liquid flow WWC system. The incorporation of a cooled collection surface and a collection liquid that reduces liquid consumption and depresses the freezing point, could be used with other sample collection devices, e.g. other liquid-based bioaerosol sampling systems. In embodiments, the "liquid conservation concept" is used to improve the operation of batch-type air sampling systems, which employ initial liquid inputs that may be followed by addition of makeup liquid, by minimizing evaporation losses.

Additional benefits may be obtained by combining the use of a cooled wall with the use of an ethylene glycol solution for the collection fluid. Embodiments including cyclone wall coolers and low vapor collection fluid offer the potential to reduce the evaporation of collection fluid during room temperature operation by about 33% to 50%, and reduce the evaporation of collection fluid during relatively high temperature operations by about 45% to 70%. Example 2 hereinbelow presents experimental results for evaporation rates for a 100 L/min WWC constructed in accordance with the principles described herein—the experiments performed with and without cyclone wall cooling, and with and without collection fluid comprising an EG-water solution. Example 3 hereinbelow discusses experimental results obtained using a 100 L/min WWC constructed in accordance with the principles described herein—the collection efficiencies for polystyrene spheres obtained with and without cyclone wall cooling and EG are presented.

A. R. McFarland patented a Transpirated Wall Aerosol Collection System and Method, U.S. Pat. No. 6,217,636, where liquid that continuously flows through a porous wall serves as the collection surface for an inertial impactor or a cyclone. Use of a cooled wall (achievable by refrigerating the liquid) together with a liquid with a reduced vapor pressure (e.g., EG), would allow reduced water consumption as compared with use of water alone with no refrigeration effect.

Other methods could be used to provide the refrigeration effect including alternate refrigeration techniques or cooling of the bulk collection liquid that is provided to the wall through a transpirated surface, which in turn provide heat transfer from the collection surface through the wall. Correspondingly, the collection surface could be heated during sub-freezing operation by this approach.

Although four heat transfer devices 155 are shown in FIGS. 5 and 6, and four TEC devices 255 are shown in FIGS. 8A-8C, in general, any number of heat transfer devices (e.g., heat transfer devices 155) and/or TEC devices (e.g., TEC devices 255) may be employed to independently control different regions of wetted wall cyclone system 100, 200. For some applications, embodiments of the wetted wall cyclone may include both heat transfer devices (e.g., heat transfer devices 155) for heating portions of the cyclone and TEC devices (e.g., TEC devices 255) for cooling portions of the cyclone. Such embodiments may be particularly useful for sampling in remote locations that periodically experience cold temperatures and hot temperatures. In addition, in some embodiments, sensors and/or a control loop feedback system may also be employed to independently monitor and control the temperature of each portion of system 100, 200 and fluids contained therein.

Figure 9A:
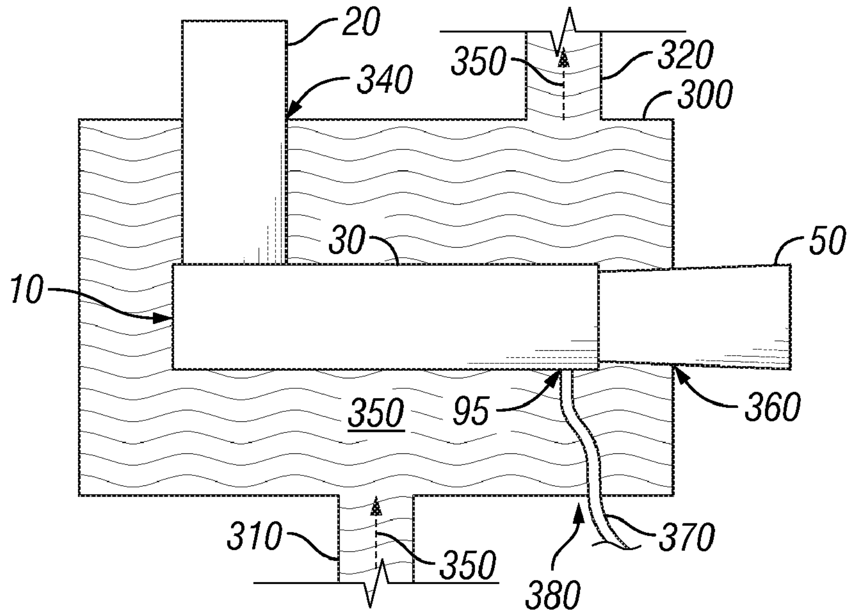
FIG. 9A is a schematic view of the wetted wall cyclone system of FIG. 1 disposed in a circulated bath of heat transfer fluid.

Although wetted wall cyclone system 100 includes four heat transfer devices 155 to provide thermal energy to at least a portion of cyclone body 130, and wetted wall cyclone system 200 includes TEC devices 255 to cool at least a portion of the cyclone body 230, in still other embodiments, the cyclone body (e.g., body 130, 230) may be partially or completely disposed or submerged in a bath comprising a heat transfer fluid capable of warming or cooling the cyclone body as desired. For example, as shown in FIG. 9A, cyclone 10 previously described is shown disposed in a fluid bath 300 comprising a inlet 310 and a coolant outlet 320. A heat transfer fluid 350, a coolant in this embodiment, flows into bath 300 via inlet 310, flows out of bath 300 via outlet 320, is cooled external to bath 300, and is then recirculated through bath 300, thereby continuously cooling cyclone body 30. In addition, bath 300 includes a cyclone inlet opening 340 through which cyclone inlet 20 extends and a cyclone outlet opening 360 through which skimmer 50 extends. Openings 340, 360 preferably form a fluid tight seal with the outer surface of cyclone inlet 20 and skimmer 50, respectively, to reduce and/or eliminate loss of heat transfer fluid 350 from bath 300 through openings 340, 360. Still further, in this embodiment, aspiration port 95 is in fluid communication with an aspiration conduit 370 for the collection of aspirated hydrosol 96. In this embodiment, aspiration conduit 370 extends from bath 300 through an aspiration conduit opening 380 and provides a path for aspirated hydrosol 96 to be collected from cyclone 10 disposed within bath 300 without mixing or contacting heat transfer fluid 350. Heat transfer across the cyclone body (e.g., cyclone body 30) enables the inner surface of the cyclone body to be maintained at appropriate temperatures. In general, the temperature of the heat transfer fluid (e.g., heat transfer fluid 350) may be controlled by external apparatus to either heat or cool the cyclone body as desired. Examples of suitable heat transfer fluids include, without limitation, EG-water solutions, propylene glycol-water solutions, or combinations thereof. In addition, vaporous refrigerants such as fluorinated hydrocarbon or ammonia used with a small heat pump/refrigerator cycle could also be utilized as the heat transfer fluid.

Figure 9B:
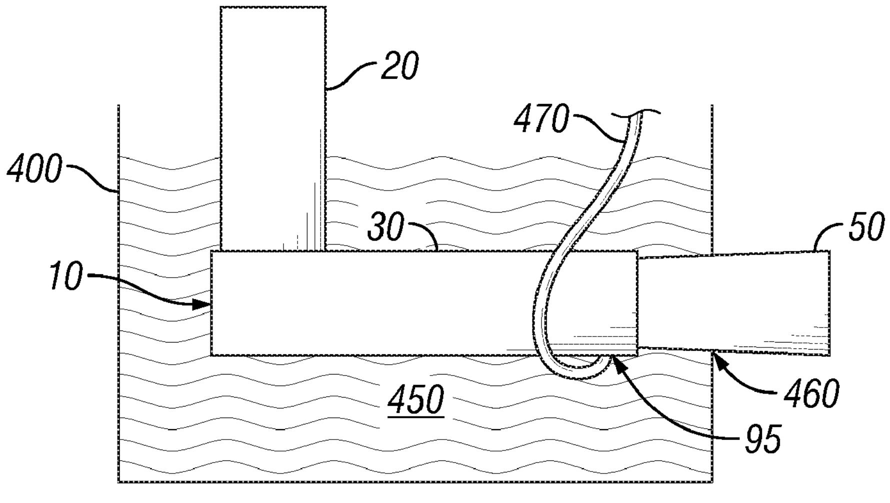
FIG. 9B is a schematic view of the wetted wall cyclone of FIG. 1 disposed in an uncirculated bath of heat transfer fluid.

As yet another example, FIG. 9B illustrates cyclone 10 previously disclosed disposed within an bath 400 comprising an uncirculated heat transfer fluid 450, an ice-water mixture in this embodiment, and a cyclone outlet opening 460 through which skimmer 50 extends. Opening 460 preferably form a fluid tight seal with the outer surface of skimmer 50 to reduce and/or eliminate loss of heat transfer fluid 450 from bath 400 through opening 460. Still further, in this embodiment, aspiration port 95 is in fluid communication with an aspiration conduit 470 for the collection of aspirated hydrosol 96.

In the manner described, embodiments described herein offer the potential for several advantages over some conventional wetted wall cyclones. First, a reduced diameter leading edge (e.g., reduced diameter leading edge 51) is provided at the leading edge of the skimmer (e.g., skimmer 50), resulting in the formation of an annulus (e.g., annulus 80) between the skimmer and the cyclone body (e.g., cyclone body 30). The annulus is sized to result in sufficient air shear to drive the film or rivulets of hydrosol (e.g., hydrosol 90) into the annulus and toward the aspiration port (e.g., aspiration port 95), thereby reducing likelihood of hydrosol stagnation proximal the skimmer, and thus, offering the potential for reduced liquid carryover.

Second, embodiments of system 100 described herein include a means for cooling the cyclone body (e.g., TEC devices 255), thereby offering the potential to reduce evaporative losses of the collection fluid from the wetted wall cyclone system, which can reduce reliance on fresh supplies of collection fluid in remote and/or relatively hot-dry environments.

Third, the use of low vapor pressure and/or low freezing point collection fluids has been disclosed. These collection fluids may be used to reduce the freezing point of the liquid for sampling in sub-freezing conditions and reduce the evaporation, and thus the liquid consumption, during above-freezing weather. A combination of cooling devices with low freezing point and low vapor pressure collection fluid, i.e. "liquid conservation concept" may enable operation of a WWC with minimal liquid consumption and power consumption over a broad range of ambient conditions.

Fourth, use of cyclone components (e.g., skimmer, cyclone body, etc.) comprising relatively high-thermally conductive material(s) offers the potential to sufficiently heat and cool specific portions of the wetted wall cyclone as desired to reduce the likelihood of freezing and evaporation of the collection fluid, and to offer the potential to maintain the viability of biological material entrained in the collection fluid in relatively harsh environments. Such high-thermal conductivity materials also offer the potential for reduced power consumption while maintaining a sufficient temperature of the skimmer.

EXAMPLES

Example 1

Effect of Ethylene Glycol on Collection Efficiency and Evaporation Rate for 100 L/min WWC Tests were conducted to determine the effects on aerosol-to-hydrosol collection efficiency of operating the 100 L/min WWC according to this disclosure with a 30% solution (by volume) of ethylene glycol in water as the collection fluid. The unit sampled an aerosol comprised of 3 μm polystyrene (PSL) spheres from air that was initially at 75° F. and 55% relative humidity. The wall of the cyclone was at room temperature. The liquid inflow and outflow rates were measured for these experiments to provide information on evaporative losses.

Figure 10:
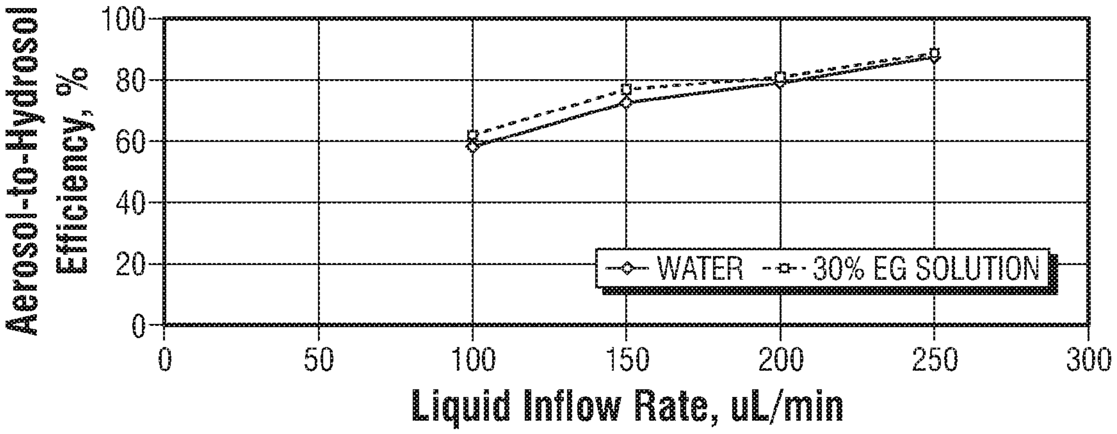
FIG. 10 is a plot of aerosol-to-hydrosol collection efficiency for a 100 L/min wetted wall cyclone, as described in Example 1.

The results of the efficiency tests are shown in FIG. 10, which is a plot of aerosol-to-hydrosol collection efficiency. From the results in FIG. 10, it is noted that the efficiency appears to be unaffected by the use of an ethylene glycol solution as compared with water alone (a small amount, 0.025% of Tween-20 (by volume) was added to the water).

Tests were also conducted to determine the time needed for the first appearance of liquid in the effluent liquid aspiration tube. With air flowing though the cyclone, the time between the start of liquid injection at an inflow rate of 250 μL/min, and the first appearance of the liquid in the effluent flow port was measured. The value was about 20 seconds (s) for both water and the 30% (by volume) ethylene glycol solution. Even when the air entering the cyclone was at a temperature of −10° C., the value was still about 20 s for the 30% (by volume) ethylene glycol solution.

Figure 11:
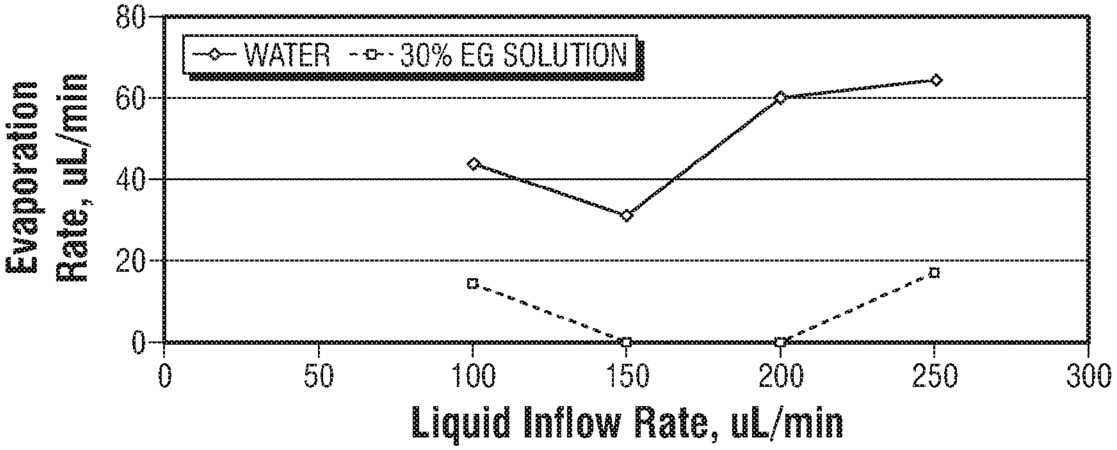
FIG. 11 is a plot of evaporation rate of water from a 100 L/min wetted wall cyclone as a function of liquid inflow rate, as described in Example 1.

FIG. 11 is a plot of the rate of evaporation of water from the 100 L/min WWC. As seen in FIG. 11, when water was used as the collection fluid, the average evaporation rate was about 50 μL/min for inlet liquid flow rates over the range of 100 to 250 μL/min and for the sampled air at 75° F. and 55% relative humidity. In contrast, the average evaporation rate was only 8 μL/min when the collection fluid was a 30% solution of ethylene glycol. The average evaporation rate/liquid consumption thus decreased by 84% in this example.

Example 2

Evaporation Losses for 100 L/min WWC as Affected by Collection Liquid, Sampled Air Temperature, and Cyclone Wall Temperature Tests were conducted to determine the liquid evaporation rate while the cyclone according to this disclosure was used to sample air at room temperature and at 40° C. The effect of cooling the wall was examined by submerging the cyclone in a box containing ice water. This approach provided a cyclone body inner wall temperature that approached 0° C. The testing involved checking the evaporation rates with and without the ice water (cyclone wall at the ice point and at room temperature), with water and with 30% (by volume) ethylene glycol as the collection fluid, and with the sampled air at room temperature 24° C. (75° F.) and at 40° C. (104° F.). Results showing the evaporation losses for liquid input flow rates of 200-300 μL/min are plotted in FIG. 12.

With air flowing though the cyclone, the time between the start of liquid injection at an inflow rate of 250 μL/min, and the first appearance of the liquid in the effluent flow port was measured. This time was about 20 seconds (s) for all test conditions (air at room temperature or at 40° C., cyclone wall at room temperature or at 0° C., and use of water or the 30% (by volume) ethylene glycol collection fluid).

Figure 12:
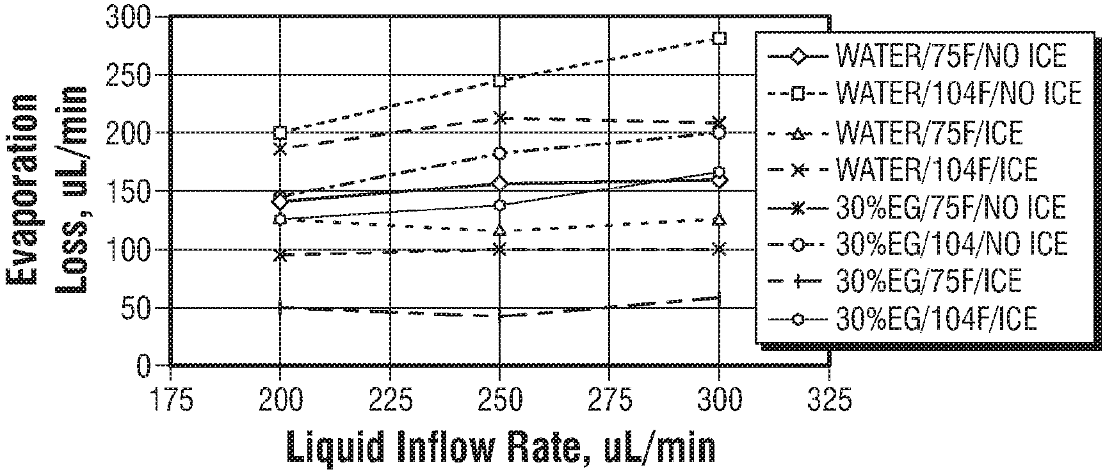
FIG. 12 is a plot of evaporation losses as a function of liquid inflow rate for a 100 L/min wetted wall cyclone as described in Example 2. In the legend, "Water and 30% EG" refer to the collection liquid, "75 F and 104 F" refer to the temperature of the sampled air, and "Ice, and No Ice" refer to whether or not the cyclone wall was cooled to the ice point temperature.

The results presented in FIG. 12 indicate that reducing the wall temperature reduced the evaporation losses. For example, when the collection fluid was the 30% (by volume) ethylene glycol solution, the sampled air was at 75° F., and the liquid input flow rate was 250 μL/min, the evaporation rate was 101 μL/min if the wall temperature was at room temperature, but it was only 41 μL/min when the cyclone wall was at the ice point. Thus, for room temperature operation, the use of a cooled wall reduced the evaporation for the 30% (by volume) ethylene glycol solutions in this example by 59%.

Use of ethylene glycol in the collection fluid reduced the evaporation rate. When the sampled air is at room temperature, the liquid input flow rate is 250 μL/min, and the wall temperature is near the ice point, the evaporation rate is 120 μL/min if water is the collection fluid. In contrast, the evaporation rate is 41 μL/min when the collection liquid is the 30% ethylene glycol solution. Thus, in this example, the use of 30% EG reduced the evaporation rate for a WWC operated with a wall at ice point by 66%.

Use of both ethylene glycol and a cooled cyclone wall resulted in the lowest evaporation rate. When the collection liquid input flow rate was 250 μL/min, and the sampled air was at room temperature, the combination of use of water for the collection fluid and operation with the cyclone wall at room temperature resulted in an evaporation loss of 158 μL/min. When the 30% solution of ethylene glycol was used as the collection fluid and the wall was cooled to near the ice point, the evaporation rate was 41 μL/min. Thus, in this example, combination of cooling and low vapor pressure collection fluid decreased evaporation by 74% compared with combination of water and room temperature wall.

A WWC bioaerosol sampler that operated at 100 L/min generally performed well with a liquid outflow rate greater than or equal to approximately 100 μL/min. The results shown in FIG. 12 indicate that with a WWC operated at 100 L/min, and sampling air at 24° C. and 43% relative humidity, a liquid inflow (water) to the cyclone of about 300 μL/min provided a liquid outflow rate of 140 μL/min. However, when the sampled air was 40° C., a liquid inflow (water) rate of 300 μL/min resulted in an outflow rate of only 19 μL/min. A wetted wall cyclone would have limited operability under these latter conditions. In contrast, if the inner wall of the cyclone was cooled to near 0° C., a liquid inflow rate of 300 μL/min would produce an outflow of 96 mL/min when the sampled air was at 40° C. A 100 L/min WWC would function satisfactorily at those conditions.

When the WWC sampled room temperature air at 100 L/min, with a collection fluid comprising a 30% (by volume) solution of ethylene glycol (EG) in water, and the cyclone wall was cooled to 0° C., a liquid output of 100 μL/min could be obtained with an input of only 140 μL/min. Correspondingly, with an air temperature of 40° C., a liquid outflow of 100 μL/min could be obtained with an inflow of about 230 μL/min.

These results show that when sampling 100 L/min of air at room temperature, the combination of a cooled wall and the use of 30% (by volume) ethylene glycol, reduced evaporation by about 100 μL/min when the liquid inflow was in the range of 200 μL/min to 300 μL/min. This offers the potential to reduce water consumption by about 4 L/month. When the air was at 40° C., the data shows that the combination of wall cooling and use of 30% (by volume) ethylene glycol reduces the liquid evaporation by about 140 μL/min; and, more importantly, makes remote operation of the WWC in a 40° C. environment feasible.

Example 3

Aerosol Sampling Performance of 100 L/min WWC Operated with a Cooled Inner Surface and with a 30% Ethylene Glycol Collection Fluid Tests have also been conducted with 3 μm aerodynamic diameter (AD) polystyrene spheres to compare the aerosol-to-hydrosol collection efficiency of the 100 L/min WWC for the system operated with a cooled cyclone body versus a cyclone body at room temperature and a 30% (by volume) ethylene glycol collection liquid versus water. With the cyclone wall at room temperature and a liquid (water) inflow rate of 250 μL/min (outflow rate of 140 μL/min), the aerosol-to-hydrosol collection efficiency was 88%. When the wall was near 0° C., the collection fluid was a 30% solution of ethylene glycol, and, the liquid inflow rate was 250 μL/min (effluent flow rate of 235 μL/min) the collection efficiency was 92%.

Example 4

Aerosol Sampling Performance of 100 L/min Cyclone: *Bacillus atrophaeus* (BG) Test Particles A 100 L/min cyclone according to this disclosure was tested with *Bacillus atrophaeus* (BG) spores (single spores and clusters formed from appropriate dilutions of a 25 mg BG spores/5 ml mill-Q (MQ) water stock suspension). The testing was performed at room temperature (RT) in a biosafety cabinet, using a six-jet Collision atomizer to generate the single-spore aerosols or an Inkjet Aerosol Generator (IJAG) to generate the BG clusters. The generated bacterial particles were continuously introduced into the cyclone for a 5 min period during which the collection fluid (phosphate buffer saline solution (PBST), pH 7.4, with 0.1% Triton-X100) at an inflow rate of 400 μl/min, was pumped into the air blast atomizer of the cyclone. The hydrosol collection process was continued for an additional 2 min after the aerosol generation was stopped. At least four tests were run with each bacterium suspension. A washing period with MQ water was inserted between the sampling cycles to remove any PBST salt deposits, followed by a PBST wash for 3 min. At the end of the tests, the hydrosols were collected and the weights were measured. Colony Forming Unit (CFU) values were determined by plating appropriate dilutions on TSA plates. Collection efficiencies were calculated by comparing the hydrosol CFU values with CFU values obtained from analysis of suspensions of BG from collection of the test aerosol on reference filters during the 5 min sampling periods. The reference filters, 0.4

μm HTTP PC filters (47 mm, Millipore) were operated at 20 L/min airflow, after which the filters were placed in 5 ml of PBST solution and the microbes were suspended by vigorous vortexing.

Figure 13:
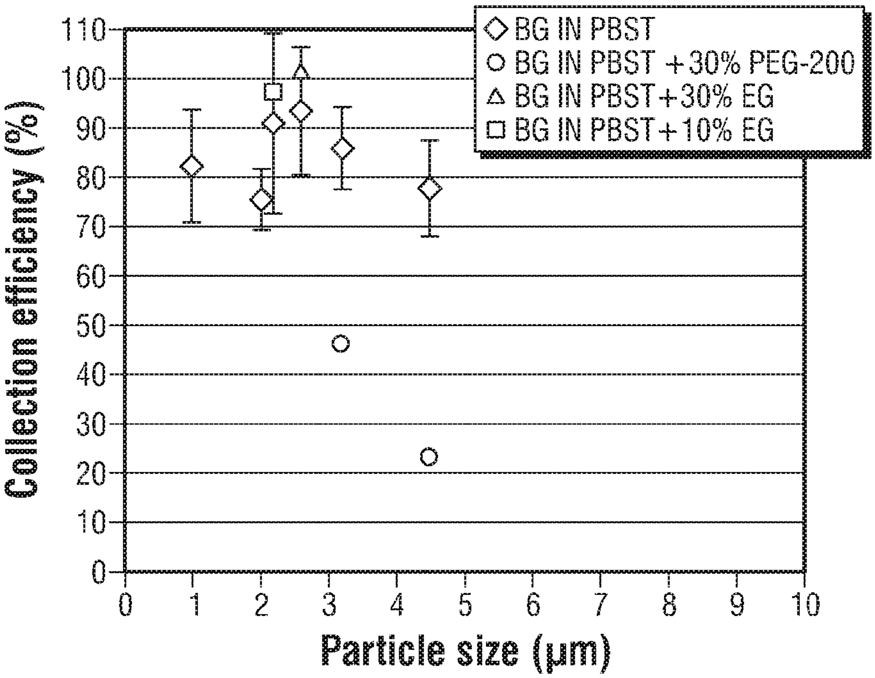
FIG. 13 is a plot of the aerosol-to-hydrosol collection efficiency as a function of particle size for the BG tests of Example 4.

Collection liquids used in the tests were PBST (Example 4A), PBST with 30% (by volume) polyethylene glycol (PEG-200) (Example 4B), PBST with 30% (by volume) ethylene glycol (Example 4C), and PBST with 10% (by volume) ethylene glycol (Example 4D). The collection efficiency results from Examples 4A-4D are given in Table 1. FIG. 13 is a plot of the collection efficiency as a function of particle size for the BG test data obtained in Examples 4A-4D. As described further in Examples 4A through 4D, except for tests where a solution of PEG-200 in PBST was used as the collection fluid, at room temperature, 76-93% of the BG spores in the size range of 1 μm-4.5 μm were recovered during the 7 min hydrosol recovery periods. Higher collection efficiency values were found for the samples containing 10-30% (by volume) ethylene glycol (EG) compared to 30% (by volume) polyethylene glycol (PEG-200).

Example 4A

Collection of BG Spores by 100 L/min WWC with PBST Collection Liquid

As seen in the results presented in Table 1 and FIG. 13, at room temperature with PBST used as the collection fluid, the collection efficiency was 82.2% for single spore (1 μm particle size) BG particles. For the larger particle sizes, 2 to 4.5 μm, the efficiency values ranged from 75.6% to 93.4, with an average value over all sizes of 84.7%.

Example 4B

Collection Efficiency of Viable BG Spores by 100 L/min WWC with a Collection Liquid Comprised of PBST and 30% (by Volume) PEG-200

The tests with the 3.2 μm and 4.5 μm BG particles were repeated by adding 30% (by volume) PEG-200 to the PBST collection solution. Using a polyethylene glycol solution would enable the operation of the cyclone at low temperatures (less than 10° C.) without heating the cyclone body. The results for the 30% (by volume) PEG tests shown in Table 1 and FIG. 13 indicate lower efficiency for the PEG as relative to the PBST, 46% versus 86% for the 3.2 μm and 23% versus 78% for the 4.5 μm BG particles collected in PBST with 30% PEG-200. The decrease was likely due to the osmotic stress caused by the high water-binding capacity of the PEG-200. The BG spores collected in the 30% (by volume) PEG-200 exhibited a significantly slower growth, requiring 48 hours for about 50% of the total colonies to appear. However, for applications where a wetted wall cyclone is used to provide samples to a device that analyzes the DNA of the microorganisms, the use of PEG may be advantageous because the osmotic action would help to access the DNA inside the microorganism even though the viability of the organisms might be less.

During the 30% (by volume) PEG tests a significant amount of oily liquid was accumulating under the cyclone outlet, consisting of PEG of high density and concentration. Due to the fact that most of the water is evaporating in the cyclone, the concentration of PEG in the hydrosol may become significantly higher than the initial 30% (by volume), leading to bypass. This is also supported by the high viscosity of the recovered samples. A PEG concentration of greater than 30% (by volume) in the hydrosol is expected to adversely affect the viability and collection efficiency of the BG spores.

Example 4C

Collection Efficiency of Viable BG Spores by 100 L/min WWC with PBST and 30% Ethylene Glycol Collection Liquid To test the effects of another compound that is widely used to decrease the freezing points of solutions, experiments were conducted using ethylene glycol (EG) with 2.6 μm BG particles. The 30% (by volume) EG did not effect the viability of the spores, resulting in relatively high (~100% versus 93%) collection efficiency compared with results for PBST with no EG. Higher weight/min average values were measured for the hydrosol output flow (0.18 g/min, versus 0.13 g/min), indicating less evaporation than for the PBST collection fluid, which results are similar to the hydrosol weight with 30% PEG (0.16 g/min versus 0.11 g/min, Table 1).

Example 4D

Collection Efficiency for Viable BG Spores in 100 L/min WWC with PBST and 10% Ethylene Collection Liquid As the final concentration of PEG or EG can be significantly higher than 30% (by volume) in the samples due to evaporation, tests with lower (10% (by volume)) concentration of EG were conducted to evaluate the collection efficiency of the cyclone with 2.2 μm BG clusters. As seen in the results of Table 1 and FIG. 13, a higher collection efficiency (greater than 90%) was obtained for the samples with 10% (by volume) EG than without EG, similar to the results of the 30% (by volume) EG tests with 2.6 μm BG clusters.

TABLE 1

Collection Efficiency Values for BG Clusters of 1-4.5 μm Collected in PBST with and without Polyethylene Glycol (PEG-200) and Ethylene Glycol (EG) (the Weight (g/min) is the average liquid outflow)

| | PBST Weight | | | PBST + 30% PEG-200 Weight | | | PBST + 30% EG Weight | | | PBST + 10% EG Weight | | |
|---|---|---|---|---|---|---|---|---|---|---|---|---|
| Size μm | Collection eff. % | STDEV % | g/min | Coll. Eff. % | STDEV % | g/min | Coll. Eff. % | STDEV % | g/min | Coll. eff. % | STDEV % | g/min |
| 1 | 82.3 | 11.5 | 0.11 | | | | | | | | | |
| 2 | 75.6 | 6.3 | 0.11 | | | | | | | | | |
| 2.2 | 91.1 | 18.3 | 0.13 | | | | | | | 97.3 | 10.8 | 0.11 |
| 2.6 | 93.4 | 13.1 | 0.13 | | | | 102 | 3.2 | 0.18 | | | |

TABLE 1-continued

Collection Efficiency Values for BG Clusters of 1-4.5 μm Collected in PBST with and without Polyethylene Glycol (PEG-200) and Ethylene Glycol (EG) (the Weight (g/min) is the average liquid outflow)

| | PBST Weight | | | PBST + 30% PEG-200 Weight | | | PBST + 30% EG Weight | | | PBST + 10% EG Weight | | |
|---|---|---|---|---|---|---|---|---|---|---|---|---|
| Size μm | Collection eff. % | STDEV % | g/min | Coll. Eff. % | STDEV % | g/min | Coll. Eff. % | STDEV % | g/min | Coll. eff. % | STDEV % | g/min |
| 3.2 | 85.6 | 8 | 0.11 | 46 | 8.3 | 0.13 | | | | | | |
| 4.5 | 77.9 | 9.9 | 0.11 | 23 | 4.5 | 0.16 | | | | | | |

Example 4E

Collection of Large Clusters of BG Spores in PBST Collection Liquid

A 100 L/min wetted wall cyclone according to this disclosure, using a PBST collection fluid, was tested with 5.4 and 8.6 μm BG clusters. The results showed efficiencies of 85.7 and 84.8%, respectively, for the two sizes, which shows the WWC cyclone collects the larger particles with about the same efficiency as those in the size range of 2 to 4.5 μm diameter, for which the average efficiency was 84.7%.

Example 5

Viability and DNA Intactness of Vegetative Cells Sampled with 300 L/min WWC

A 300 L/min Wetted Wall Cyclone (WWC) according to this disclosure was used to sample an *E. coli* aerosol to both characterize viability and to determine the amount of DNA that remained sufficiently intact to be detected by an analyzer that requires a minimum length of 50,000 base pairs. A Pulsed Field Gel Electrophoresis (PFGE) machine (BIORAD CHEF DR-II), and associated DNA ladder, were used to determine the relative amount of sufficiently sized DNA that remained after collection with the WWC. In parallel with characterization of the DNA intactness, samples of *E. coli* were also plated after collection to determine the relative number of viable organisms.

Example 5A

Aerosol Testing Methods

Mid-log phase ($OD_{600}$=0.5) cultures of MG1655 *E. coli* were grown in Luria-Bertani (LB) media, pelleted at 4000 RPM for 7 min, and diluted 10× in MQ water containing 10% (by volume) Phosphate Buffer Saline with 0.1% (by volume) Triton X-100 (i.e., PBST, pH 7.4). The suspension was aerosolized with a six-jet Collison atomizer, which created single-cell aerosol particles. For each test, aerosol was generated for about 10 min, using a fresh bacterial suspension. Water with 0.01% (by volume) Tween-20 was used as the collection fluid in the WWC, and the WWC was operated for an additional 2 min after the Collison atomizer was turned off. The tests were carried out in a bio-safety cabinet under constant airflow.

The collection tests were performed at room temperature (RT) and also at 50° C. (temperature was 50° C. at the location of the atomizer and 46° C. at the entrance of the cyclone). The weights of the liquid samples output from the WWC were measured. The viable counts of the liquid samples drawn from the collectors were determined by plating 100 μL volumes in appropriate dilutions on TSA (Tryptic Trypticase Soy Agar) plates and counting the colonies as Colony Forming Units (CFU) after incubating them overnight at 37° C. For reference samples, 47 mm A/E glass fiber filters were used to sample the aerosol at 30 L/min for 5 min. The collected bacteria were re-suspended by vigorously vortexing the filters in 5 mL PBST solution and the CFU counts were determined by plating. The DNA was extracted from the WWC collector samples, pelleted at 5000 RPM for 10 min and Pulsed Field Gel Electrophoresis (PFGE) plugs were prepared according to the BIORAD manual for CHEF-DR II Pulsed Field Electrophoresis Systems. The DNA plugs were inserted in the wells of 1% agarose gel, and run for 44 hrs in 1×TAE (Tris-Acetic Acid-EDTA) buffer at 3 V/cm, at 14° C., and at 200-1800 initial and final switch times. A DNA size standard, *Saccharomyces cerevisiae* marker (2,200-225 kb), was used.

Background samples were continuously collected to determine the background level of bacteria. The collector was decontaminated using extensive washes with elution buffer.

Example 5B

Viability Count Results

Table 2 presents the viability counts for the WWC collector liquid samples. The tests with the 300 L/min WWC collector showed total viable counts greater than 300,000 at RT and also at 50° C. These results indicate that the WWC may be used to sample relatively hot air without inducing additional viability losses in a bioaerosol.

Viability counts were also made on samples from the glass fiber reference filters and from samples collected with an impactor. Collecting *E. coli* on the glass fiber filters as reference filters resulted in low (less than 100) total CFU numbers, which is likely due to desiccation of the bacteria during the 5 min collection periods at the 30 L/min flow rate. As a consequence, those results are not shown here. The impactor sampler (data also not shown), which featured a polyurethane foam collection surface that was coated with ethylene glycol, was tested in parallel with the WWC. The viability counts from use of the impactor were about two (2) logs less than the viability counts obtained with the WWC when the sampled air was at room temperature and about four (4) logs less than the viability counts obtained with the WWC when the sampled air was at the nominal value of 50° C.

Example 5C

DNA Intactness Results

Figure 14A:
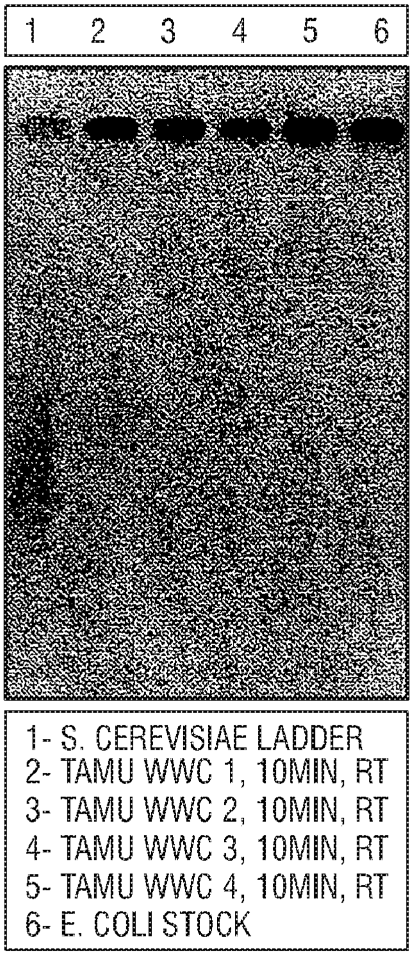
FIG. 14A is a PFGE gel reverse image of the separation of the *E. coli* genomic DNA collected at room temperature (RT) by the WWC collector, as described in Example 5.
Figure 14B:
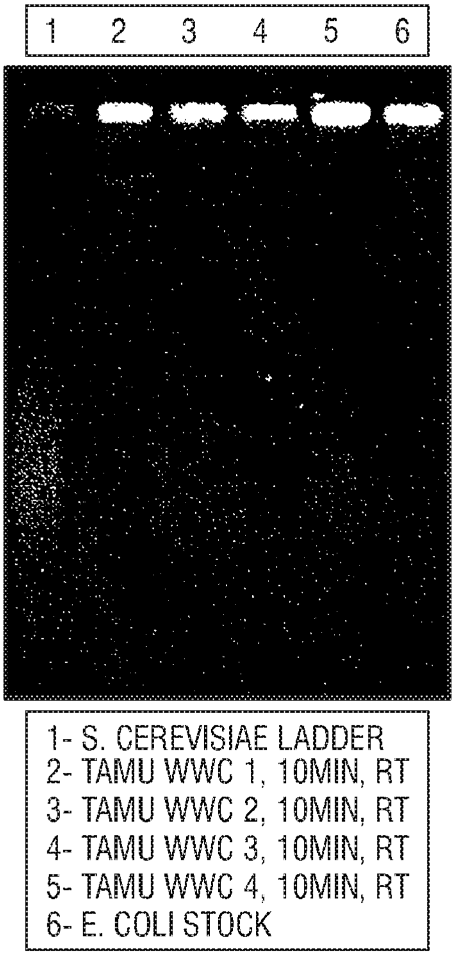
FIG. 14B is PFGE gel image of the separation of the *E. coli* genomic DNA collected at RT by the WWC collector, as described in Example 5.

The results of the DNA integrity tests with PFGE for the room temperature (RT) samples are shown in FIGS. 14A and 14B, where FIG. 14A is the reverse image of FIG. 14B. The WWC samples show intense, intact bands of greater than 4 Mb (Lanes 2-5, upper windows), similar to the DNA extracted from the *E. coli* stock suspension (Lane 6), and a low amount of background, perhaps due to the presence of contaminants (e.g. proteins). The windows at the top of the photographs in FIGS. 14A and 14B indicate the relative amount of DNA, with a high value of the optical density (FIG. 14A), signifying a high value of intact DNA. Because the WWC samples are comparable in optical density to the *E. coli* stock, the results suggests that the WWC does not significantly damage the DNA.

Figure 15A:
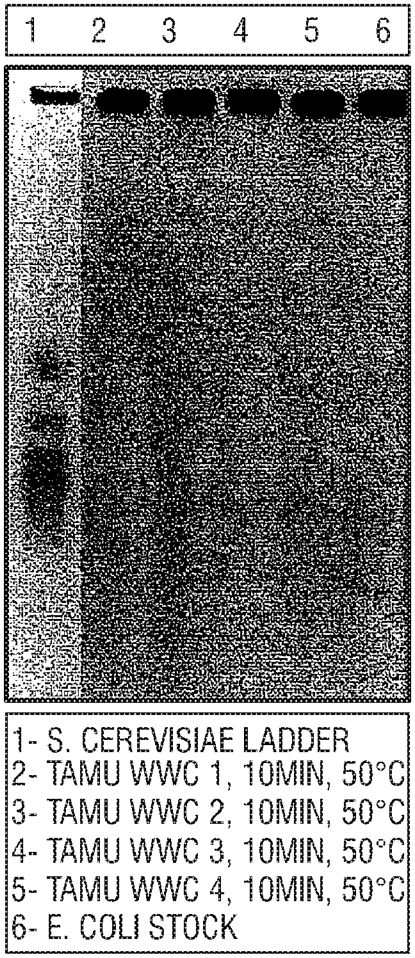
FIG. 15A is a PFGE gel reverse image of the separation of the *E. coli* genomic DNA collected from air at 50° C. by the WWC collector, as described in Example 5.
Figure 15B:
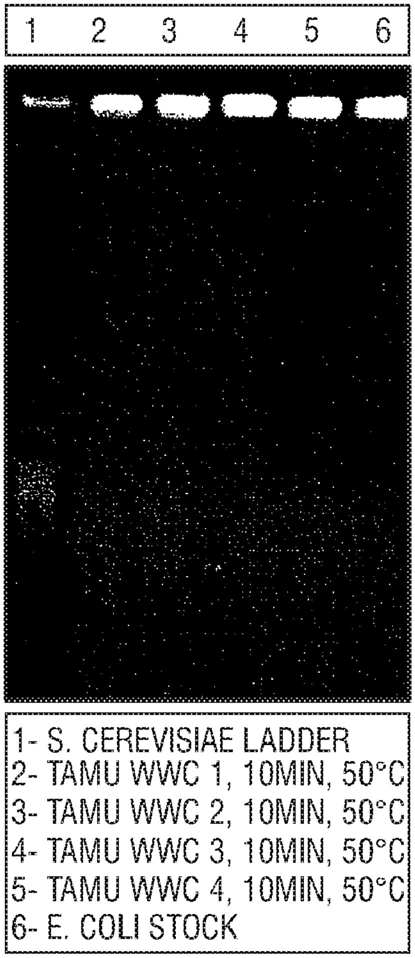
FIG. 15B is a PFGE gel image of the separation of the *E. coli* genomic DNA collected from air at 50° C. by the WWC collector, as described in Example 5.

The results of the DNA integrity tests with PFGE for the 50° C. samples are shown in FIGS. 15A and 15B, where FIG. 15A is the reverse image of FIG. 15B. The samples from the 300 L/min cyclone show high amounts of DNA greater than 4 Mb (Lanes 2-5, upper windows), FIGS. 15A and 15B, with low amount of background, similar to the *E. coli* stock sample (Lane 6) and also to the room temperature samples shown in FIGS. 14A and 14B.

TABLE 2

Viability Counts for Liquid Samples Collected by the 300 L/min WWC at RT and at 50° C.

| Room Temperature | | 50° C. | |
|---|---|---|---|
| Sample | Total CFU | Sample | Total CFU |
| 1 RT | 178282 | 1/50° C. | 365324 |
| 2 RT | 223315 | 2/50° C. | 102194 |
| 3 RT | 498632 | 3/50° C. | 288338 |
| 4 RT | 540247 | 4/50° C. | 507325 |
| AVG | 360119 | AVG | 315795 |

Example 6

Polystyrene Spheres (PSL) Sampled with 300 L/min WWC

The collection efficiency of the 300 L/min WWC according to this disclosure was also tested with 3 μm polystyrene spheres (PSL). The particles were aerosolized by atomizing a suspension of PSL for a fixed period of time using a six-jet Collison nebulizer. The hydrosols collected by the WWC were evaporated with a heat gun. The PSL particles were dissolved in 10 mL of ethyl acetate and the fluorescent intensity units (FIU) were assayed at 540 nm (excitation)/590 nm (emission) using a Quantech fluorometer. Glass fiber filters (47 mm, Type A/E, Pall Inc.), which sampled the aerosolized PSL for 5 min at 30 L/min, were used as a reference. The collection efficiency was calculated based on FIU readings of the collector and reference filters.

Table 3 shows the aerosol-to-hydrosol collection efficiency results for the sampling of aerosolized PSL by the 300 L/min WWC collector. A collection efficiency of 96.6% was obtained with the WWC collector using the 3 μm PSL particles.

TABLE 3

300 L/min WWC: Collection Efficiency for 3 μm Polystyrene Spheres

| PSL | WWC Collector | |
|---|---|---|
| Particles Diameter, μm | Sample | Collection Efficiency % |
| 3 | 1 RT | 95.4 |
| 3 | 2 RT | 98 |
| 3 | 3 RT | 92.5 |
| 3 | 4 RT | 97.7 |
| 3 | 5 RT | 99.6 |
| | AVG | 95.9 |
| | STDEV | 2.7 |

While preferred embodiments have been shown and described, modifications thereof can be made by one skilled in the art without departing from the scope or teachings herein. The embodiments described herein are exemplary only and are not limiting. Many variations and modifications of the system and apparatus are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A wetted wall cyclone system comprising:
 a cyclone body including an inlet end, an outlet end, and an inner flow passage extending therebetween;
 a cyclone inlet tangentially coupled to the cyclone body proximal the inlet end, wherein the cyclone inlet includes an inlet flow channel in fluid communication with the inner flow passage of the cyclone body;
 a skimmer coaxially coupled to the outlet end of the cyclone body, wherein the skimmer comprises a separation end extending into the outlet end of the cyclone body, a free end distal the outlet end of the cyclone body, and an inner exhaust channel in fluid communication with the inner flow passage of the cyclone body extending between the separation end and the free end, wherein the separation end includes a reduced diameter leading edge defining an annulus between the outer radial surface of the separation end and the inner surface of the cyclone body proximal the outlet end of the cyclone body; and
 means for reducing the temperature of at least a portion of the cyclone body.

2. The system of claim 1 wherein the means for reducing the temperature comprises at least one thermoelectric cooler.

3. The system of claim 2 wherein the at least one thermoelectric cooler is coupled to the outside of the cyclone body.

4. The system of claim 1 wherein the means for reducing the temperature comprises a fluid bath at least partially surrounding the cyclone body.

5. The system of claim 1 wherein the skimmer further comprises an annular groove axially spaced apart from the reduced diameter leading edge, and wherein the annular groove defines a gland that is in fluid communication with the annulus via a flow passage disposed between the outer surface of the skimmer and the inner surface of the cyclone body.

6. The system of claim 5 wherein the cyclone body includes a radial aspiration port proximal the outlet end, wherein the aspiration port is in fluid communication with the gland.

7. The system of claim 6 further comprising a liquid injector operable to inject a collection fluid into the cyclone body.

8. The system of claim 7 wherein the collection fluid comprises a low vapor pressure fluid.

9. The system of claim 8 wherein the collection fluid comprises a low freezing point liquid having a freezing point below 0° C.

10. The system of claim 9 further comprising a heating device coupled to the cyclone inlet and adapted to increase the temperature of a portion of the cyclone body.

11. The system of claim 1 wherein the cyclone body comprises a material with a thermal conductivity greater than 110 W/($m^2$ K).

12. A method of sampling an aerosol comprising:

providing a wetted wall cyclone comprising:

a cyclone body including an inlet end, an outlet end, and an inner flow passage extending therebetween;

a cyclone inlet tangentially coupled to the cyclone body proximal the inlet end, wherein the cyclone inlet includes an inlet flow channel in fluid communication with the inner flow passage of the cyclone body;

a skimmer coaxially coupled to the outlet end of the cyclone body, wherein the skimmer comprises a separation end extending into the outlet end of the cyclone body, a free end distal the outlet end of the cyclone body, and an inner exhaust channel in fluid communication with the inner flow passage of the cyclone body extending between the separation end and the free end; and disposing at least a portion of the cyclone body in a fluid bath comprising a heat transfer fluid.

13. The method of claim 12 further comprising cooling the cyclone body with the heat transfer fluid in the fluid bath.

14. The method of claim 13 wherein the fluid bath includes a fluid inlet and a fluid outlet.

15. The method of claim 14 further comprising:

flowing the heat transfer fluid through the fluid inlet into the fluid bath;

flowing the heat transfer fluid across the outer surface of the cyclone body; and flowing the heat transfer fluid through the fluid outlet out of the fluid bath.

16. The method of claim 15 further comprising:

cooling the heat transfer fluid external the fluid bath after flowing the heat transfer fluid out of the fluid bath; and recirculating the heat transfer fluid back to the fluid inlet of the fluid bath.

17. The method of claim 16 wherein the heat transfer fluid comprises an ethylene glycol-water solution or a propylene glycol-water solution.

18. The method of claim 14 wherein the fluid bath comprises a cyclone outlet opening, wherein the skimmer extends through the cyclone outlet opening.

19. The method of claim 18 further comprising forming a fluid tight seal between the outer surface of the skimmer and the cyclone outlet opening.

20. The method of claim 14 further comprising:

flowing an aerosol into the inlet flow channel of the cyclone inlet;

injecting a low vapor pressure fluid into the flow channel of the cyclone inlet.

21. The method of claim 15 wherein the outlet end of the cyclone body includes an aspiration port in fluid communication with the inner flow passage, the aspiration port being in fluid communication with an aspiration conduit that extends through the fluid bath.

22. A method of sampling an aerosol in relatively hot-dry conditions, the method comprising:

providing a wetted wall cyclone comprising:

a cyclone body including an inlet end, an outlet end, and an inner flow passage extending therebetween;

a cyclone inlet tangentially coupled to the cyclone body proximal the inlet end, wherein the cyclone inlet includes an inlet flow channel in fluid communication with the inner flow passage of the cyclone body;

a skimmer coaxially coupled to the outlet end of the cyclone body, wherein the skimmer comprises a separation end extending into the outlet end of the cyclone body, a free end distal the outlet end of the cyclone body, and an inner exhaust channel in fluid communication with the inner flow passage of the cyclone body extending between the separation end and the free end;

injecting a collection fluid into the cyclone inlet, wherein the collection fluid comprises a low vapor pressure liquid.

23. The method of claim 20 wherein the collection fluid comprises a mixture of ethylene glycol and water.

24. The method of claim 20 wherein the collection fluid comprises a mixture of polyethylene glycol and water.

* * * * *